US008761245B2

(12) United States Patent
Puri et al.

(10) Patent No.: US 8,761,245 B2
(45) Date of Patent: Jun. 24, 2014

(54) CONTENT ADAPTIVE MOTION COMPENSATION FILTERING FOR HIGH EFFICIENCY VIDEO CODING

(75) Inventors: Atul Puri, Redmond, WA (US); Daniel Socek, Miami, FL (US); Chang-Kee Choi, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 12/974,940

(22) Filed: Dec. 21, 2010

(65) Prior Publication Data

US 2012/0155533 A1    Jun. 21, 2012

(51) Int. Cl.
*H04N 7/36* (2006.01)
(52) U.S. Cl.
USPC .................................................. 375/240.02
(58) Field of Classification Search
USPC ........................................ 375/240.01, 240.02
See application file for complete search history.

(56) References Cited

U.S. PATENT DOCUMENTS

| 2009/0022220 | A1  | 1/2009 | Vatis |           |
|---|---|---|---|---|
| 2010/0002770 | A1* | 1/2010 | Motta et al. | 375/240.16 |
| 2010/0220788 | A1  | 9/2010 | Wittmann |           |
| 2012/0008686 | A1* | 1/2012 | Haskell | 375/240.16 |
| 2012/0082217 | A1* | 4/2012 | Haskell | 375/240.12 |

FOREIGN PATENT DOCUMENTS

| EP | 2157799 | 2/2010 |
|---|---|---|
| WO | 2012/088357 A2 | 6/2012 |
| WO | 2012/088357 A3 | 12/2012 |

OTHER PUBLICATIONS

Wedi T, "Adaptive interpolation filter for motion compensated prediction," Proceedings of the International Conference on Image Processing (ICIP) 2002, pp. 509-512.
Vatis V et al., "Locally adaptive non-separable interpolation filter for H.264/AVC," Proceedings of the International Conference on Image Processing (ICIP) Oct. 2006.
Vatis V et al., "Coding of coefficients of two-dimensional non-separable adaptive Wiener interpolation filter," Proceedings of the SPIE Visual Communications and Image Processing (VCIP) Jul. 2005.
Wittmann S et al., "Separable adaptive interpolation filter for video coding," Proceedings of the International Conference on Image Processing (ICIP) 2008, pp. 2500-2503 (Abstract only).
Liu, Yu "H265.net, Witness the development of H.265, Adaptive Post/Loop Filters in JM/KTA—Part 1" Aug. 22, 2009.
Liu, Yu "H265.net, Witness the development of H.265, Adaptive Post/Loop Filters in JM/KTA—Part 2" Aug. 23, 2009.
Dong, Jie "H265.net, Witness the development of H.265, Two Loop Filters in KTA," Aug. 1, 2009.
International Search Report received for PCT Application No. PCT/US2011/066666, mailed on Aug. 17, 2012, 2 pages.
International Preliminary Report on Patentability and Written Opinion received for PCT Application No. PCT/US2011/066666, mailed on Jul. 4, 2013, 6 pages.

* cited by examiner

*Primary Examiner* — Jay Patel
*Assistant Examiner* — Yulin Sun
(74) *Attorney, Agent, or Firm* — AEON Law; Adam L. K. Philipp

(57) ABSTRACT

A system and method for adaptive motion filtering to improve subpel motion prediction efficiency of interframe motion compensated video coding is described. The technique uses a codebook approach that is efficient in search complexity to look-up best motion filter set from a pre-calculated codebook of motion filter coefficient set. In some embodiments, the search complexity is further reduced by partitioning the complete codebook into a small base codebook and a larger virtual codebook, such that the main calculations for search only need to be performed on the base codebook.

13 Claims, 24 Drawing Sheets

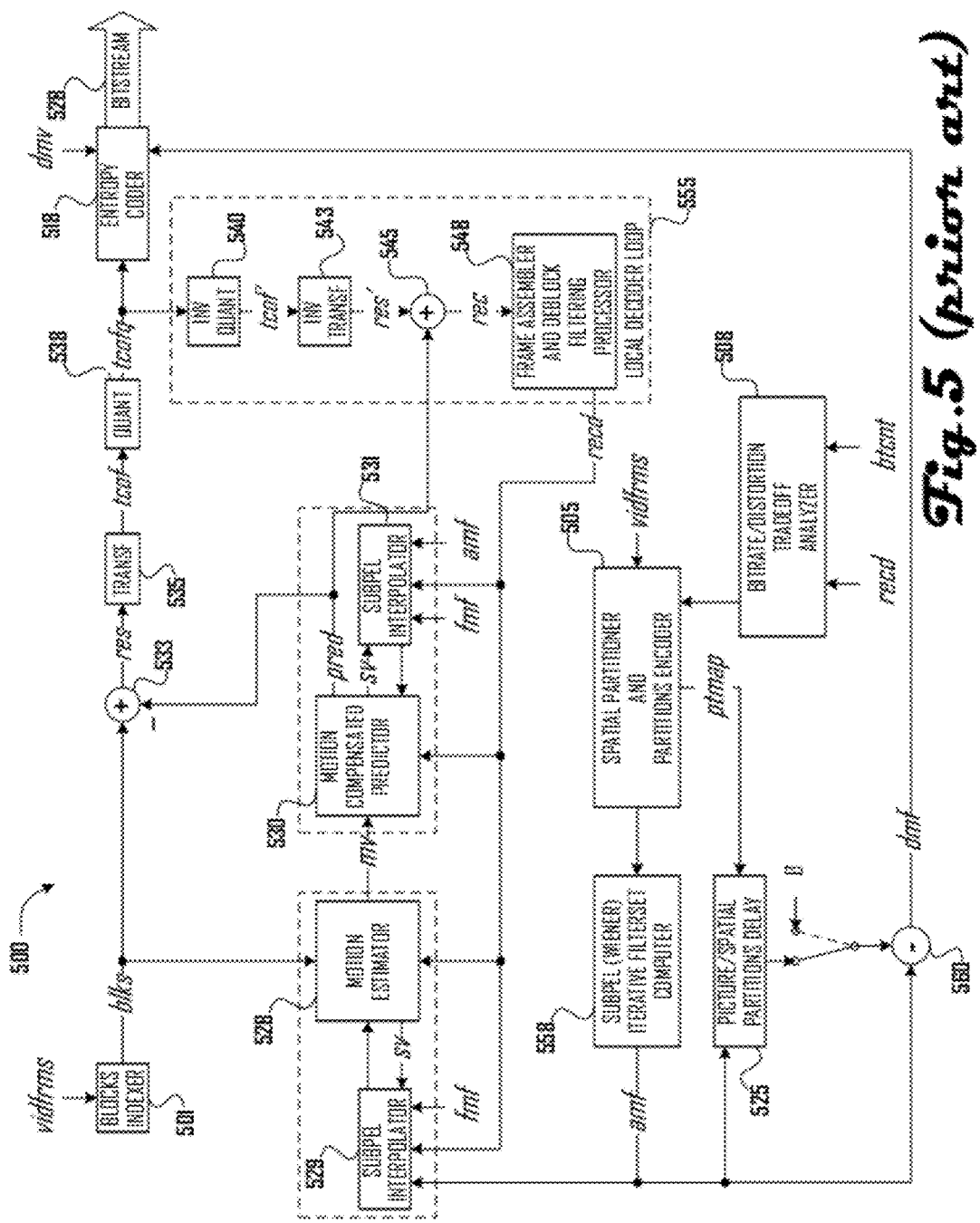

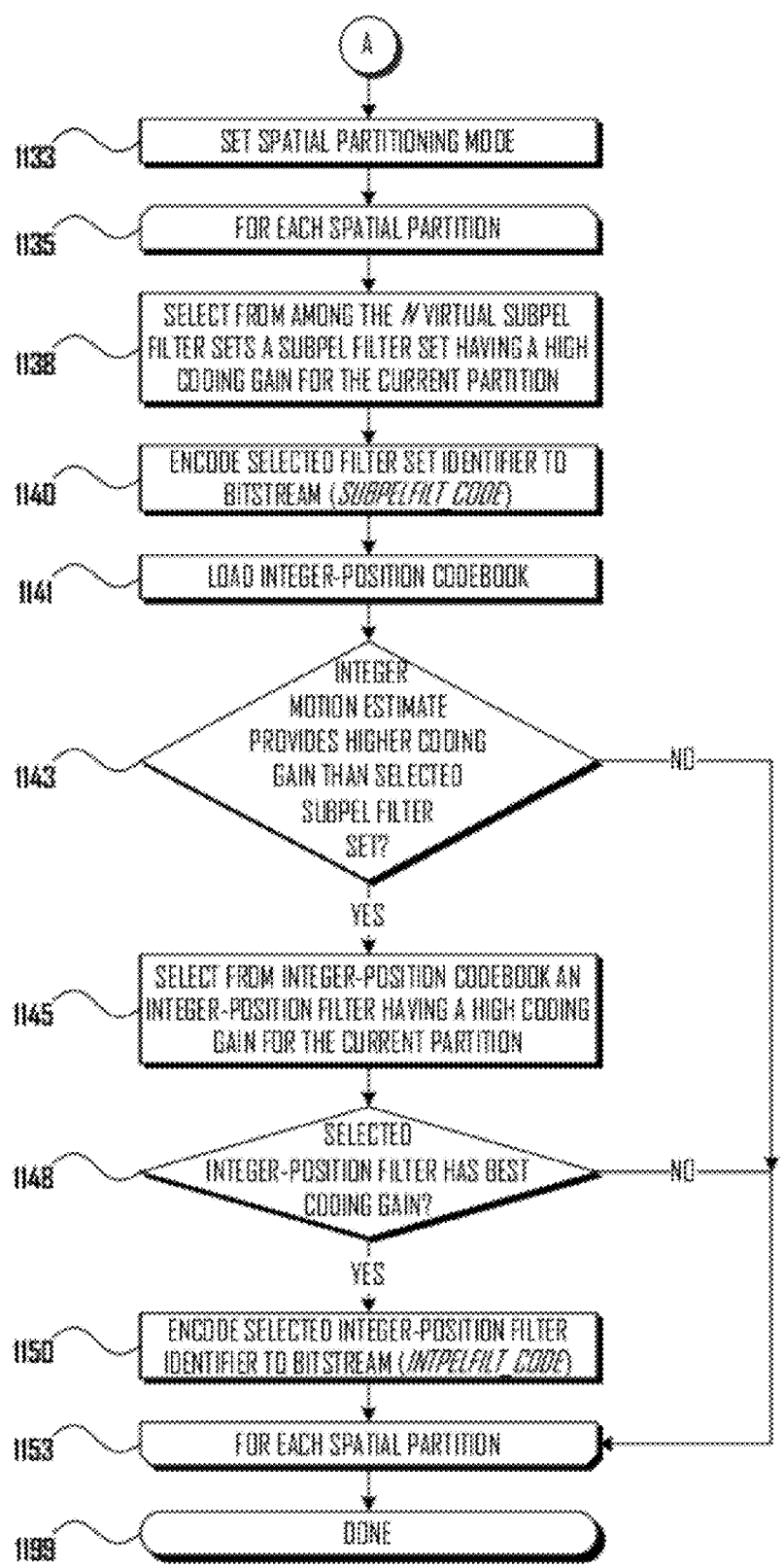
Fig. 11 (con'd)

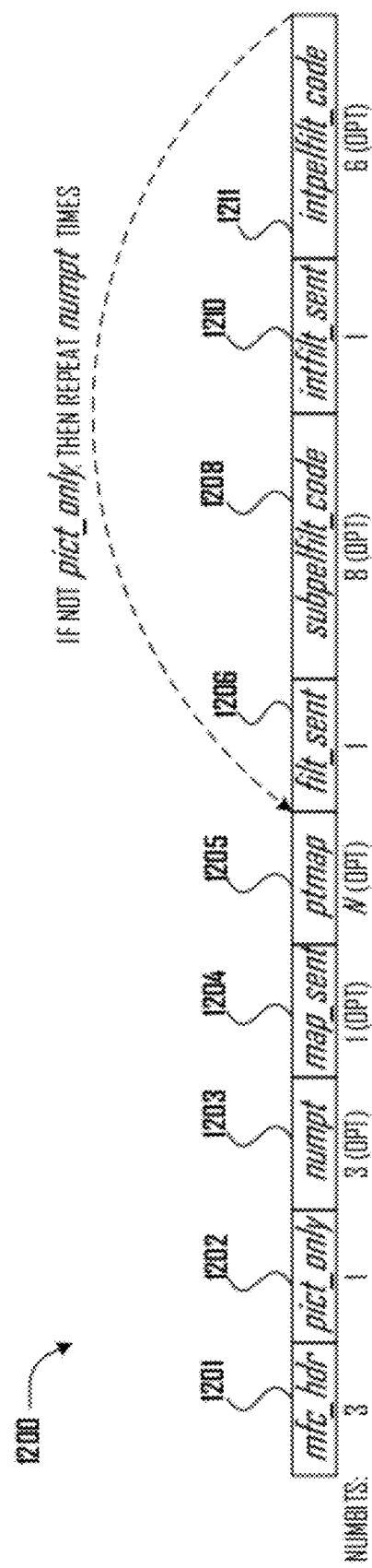

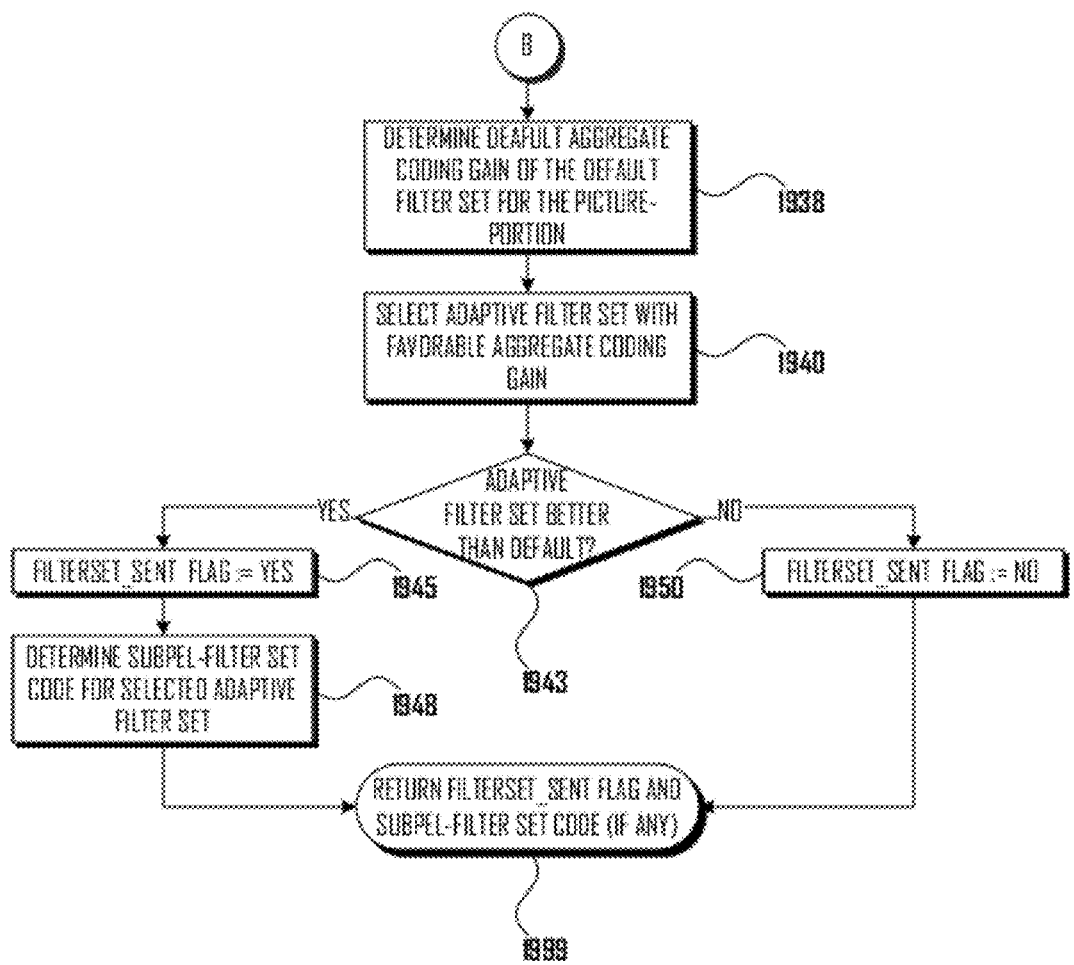
Fig. 19 (con'd)

CONTENT ADAPTIVE MOTION COMPENSATION FILTERING FOR HIGH EFFICIENCY VIDEO CODING

FIELD

This disclosure relates to encoding and decoding of video signals, and more particularly, to codebook-based encoding and decoding of adaptive filters used for motion compensated prediction.

BACKGROUND

The advent of digital multimedia such as digital images, speech/audio, graphics, and video have significantly improved various applications as well as opened up brand new applications due to relative ease by which it has enabled reliable storage, communication, transmission, and, search and access of content. Overall, the applications of digital multimedia have been many, encompassing a wide spectrum including entertainment, information, medicine, and security, and have benefited the society in numerous ways. Multimedia as captured by sensors such as cameras and microphones is often analog and the process of digitization in the form of Pulse Coded Modulation (PCM) renders it digital. However, just after digitization, the amount of resulting data can be quite significant as is necessary for recreation of the analog representation needed by speakers and/or TV display. Thus, efficient communication, storage or transmission of the large volume of digital multimedia content requires its compression from raw PCM form to a compressed representation, and thus many techniques for compression of multimedia have been invented. Over the years, video compression techniques have grown very sophisticated to the point that they allow achieving high compression factors between 10 and 100 while retaining high psychovisual quality, often similar to uncompressed digital video.

While tremendous progress has been made to date in the art and science of video compression (as exhibited by the plethora of standards bodies driven video coding standards such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, and smartphones, fueling the desire for even higher levels of video compression. In the standards-body-driven standards, this is evidenced by the recently started effort by ISO MPEG in High Efficiency Video Coding (HEVC), which is expected to combine new technology contributions and technology from last couple of years of exploratory work on H.265 video compression by ITU-T standards committee.

All aforementioned standards employ a general interframe predictive coding framework that involves reducing temporal redundancy by compensating for motion between frames (or fields) of video by first dividing a frame into blocks and assigning motion vector/s to each block of a frame to be coded, with respect to past decoded frame; these motion vectors are then transmitted to the decoder and used to generate a motion compensated prediction frame that is differenced with a past decoded frame and coded block by block, often by transform coding. For higher coding efficiency, it has been recognized that motion vector/s should have a higher precision than integer pixel, so MPEG-1 and MPEG-2 allow ½ pixel accuracy while more recent standards such as MPEG-4 part 2 (version 2) video, and H.264 use ¼ pixel accuracy motion compensation. However since actual pixels of a frame are only available at integer pixel precision, special filters are needed to interpolate a block of previous frame to a subpel location as needed for generating motion compensated prediction. The H.264 standard specifies a fixed filter set of separable filters that can be used for generating all 16 phases needed for ¼ pel interpolation. This fixed filter set is theoretically optimum, as it is derived from Weiner theory for maximum gain; however, some filters in the fixed filter set are limited to 6 taps, while for others as many as 9 taps are allowed. Furthermore, there is some loss in accuracy in the integerization process due to precision limitation. While this type of prediction generally works on the average, this or any other single fixed filter, for specific pictures or scenes, can have a mismatch with characteristics of content, so there is room for improvement.

Over last few years there has been substantial research in the area of filtering for ¼ pel motion compensation leading to development of adaptive motion filtering. In adaptive filtering, coefficients are not fixed and thus are not known a priori; i.e., the coefficients are computed from the content itself and vary with time. The mathematical procedure used to compute filter coefficients is based on wiener hopf equation.

While the weiner hopf mathematical procedure can calculate an optimum filter coefficient set, there are significant issues in practical integration of this approach in a video coding system. Thus in the context of H.265 and/or HEVC development, a number of proposals have been made to address the various shortcomings as well as to increase adaptivity for improved coding gain. These proposals can be briefly listed as follows.

Choice between nonseparable vs. separable filters—The computation of nonseparable filters can be more compute intensive, but theoretically nonseparable filters can result in higher quality. However, nonseparable filters also require roughly twice the number of coefficients of separable filters so the coding overhead of nonseparable filters can be high. Overall, for motion filtering, separable filters can provide reasonable coding gain and thus offer an overall better tradeoff.

The tradeoff of number of iterations vs. gain for each iteration—The iterative solution to weiner hopf equation takes a number of iterations to converge to give good results. The number of iterations needed depends on how far the default filter set (used initially for first iteration) is from the optimum results. If they are close, often up to 4 iterations may be enough, but if they are very different, 16 to 20 iterations may be needed. If the difference between default filter and the optimal filter is a lot, stopping at 4 iterations will not result in most of the gains.

Accuracy of various coefficients for best tradeoff of bit cost vs. quality—By keeping certain coefficients in a filter set to lower accuracy, some bit savings can result. In fact the maximum precision of a filter coefficient often can be limited to 8 bits, and in some exceptional cases, the precision used may be limited to 10 bits.

Coefficient bit cost reduction for transmission to decoder (actual values, differential, limits on updates)—The number of coefficients to be sent to decoder must be limited, as for instance, typically nonseparable filter set may require sending as many as 120 coefficients (with bit cost of 650-950 bits per frame) while even a separable filter set may require sending 45-60 coefficients (with bit cost of 400-550 bits per frame). With differential coding (encode filter set of current frame differentially with previous frame's filter set, or even with respect default filter set) or by placing limits on updates, this bit count can be reduced somewhat, albeit with some loss in quality.

Multiple filter sets within a picture to improve overall gains—While even one wiener filter set computed every frame, can give gains over, say, the H.264 standard filter set, by having a choice of multiple filter sets within a frame (such as on block or slice basis) can result in higher gains. One problem however that the bit cost of even 2 filter sets per frame may be excessive as compared to the additional gains. Thus managing bit cost of filter coefficient is necessary when using multiple filter sets.

Rate Distortion Optimization ("RDO") complexity as it may otherwise involve multiple iterations on filter switching map to derive the best results—When using multiple filters, to get high gain, often it is necessary to use rate distortion optimization in an iterative manner to get the right block size for filter selection that yields a good tradeoff between frequency of filter switching versus the gains.

Block map overhead bit cost when using multiple filters—When using multiple filters (including the case of switching between a standard filter and a computed filter), the switching map cost can be substantial. For instance, if one were to switch between two filters on a macroblock basis using 1 bit for macroblock, then for a Common Intermediate Format ("CIF") sequence, 396 bits of extra overhead would be added, in addition to bits cost to possibly send two filter-sets.

Additional gains by using integer position filters, and filters with offsets—Some attempts have been made to squeeze gains by computing a filter for integer position in case when the best ¼ pel position is the integer position. Further, some experiments have been conducted using filters with offsets for higher gains. Both these cases require additional bits of overhead.

As noted earlier, while many techniques and variations have been suggested, the coefficient bit count overhead of current approaches, even after differential coding, is too high. Additionally, the existing techniques are computationally complex due to the need for calculating on the fly multiple iterations of coefficient sets. Moreover, the only way for current system to be very adaptive is by extensive use of RDO for multiple switched filters which means extra overhead and complexity.

Additional information related to adaptive motion-compensation filtering may be found in the following references, each of which is incorporated fully by reference, for all purposes:

T. Wedi, "Adaptive Interpolation Filter For Motion Compensated Prediction," Proc. Int. Conf on Image Processing (ICIP) 2002, pp. 509-511, 2002.

V. Vatis et al, "Coding of Coefficients of two-dimensional non-separable Adapive Wiener Interpolation Filter," Proc. SPIE Visual Communications and Image Processing (VCIP) 2005, July 2005

V. Vatis and Joern Ostermann, "Locally Adaptive Non-Separable Interpolaion Filter for H.264/AVC," Proc. Int. Conf on Image Processing (ICIP) 2006, October 2006.

S. Wittmann and T. Wedi, "Separable Adaptive Interpolation Filter for Video Coding", Proc. Int. Conf on Image Processing (ICIP) 2008, pp. 2500-2503, 2008.

BRIEF DESCRIPTION OF THE DRAWINGS

FIG. 5 shows a block diagram of a prior art interframe encoder employing motion compensated predictor that uses generalized adaptive motion filtering.

FIG. 12 illustrates an exemplary bitstream syntax, in accordance with various motion-compensation codebook filter encoders and decoders and variously described herein.

DETAILED DESCRIPTION

Figure 1:
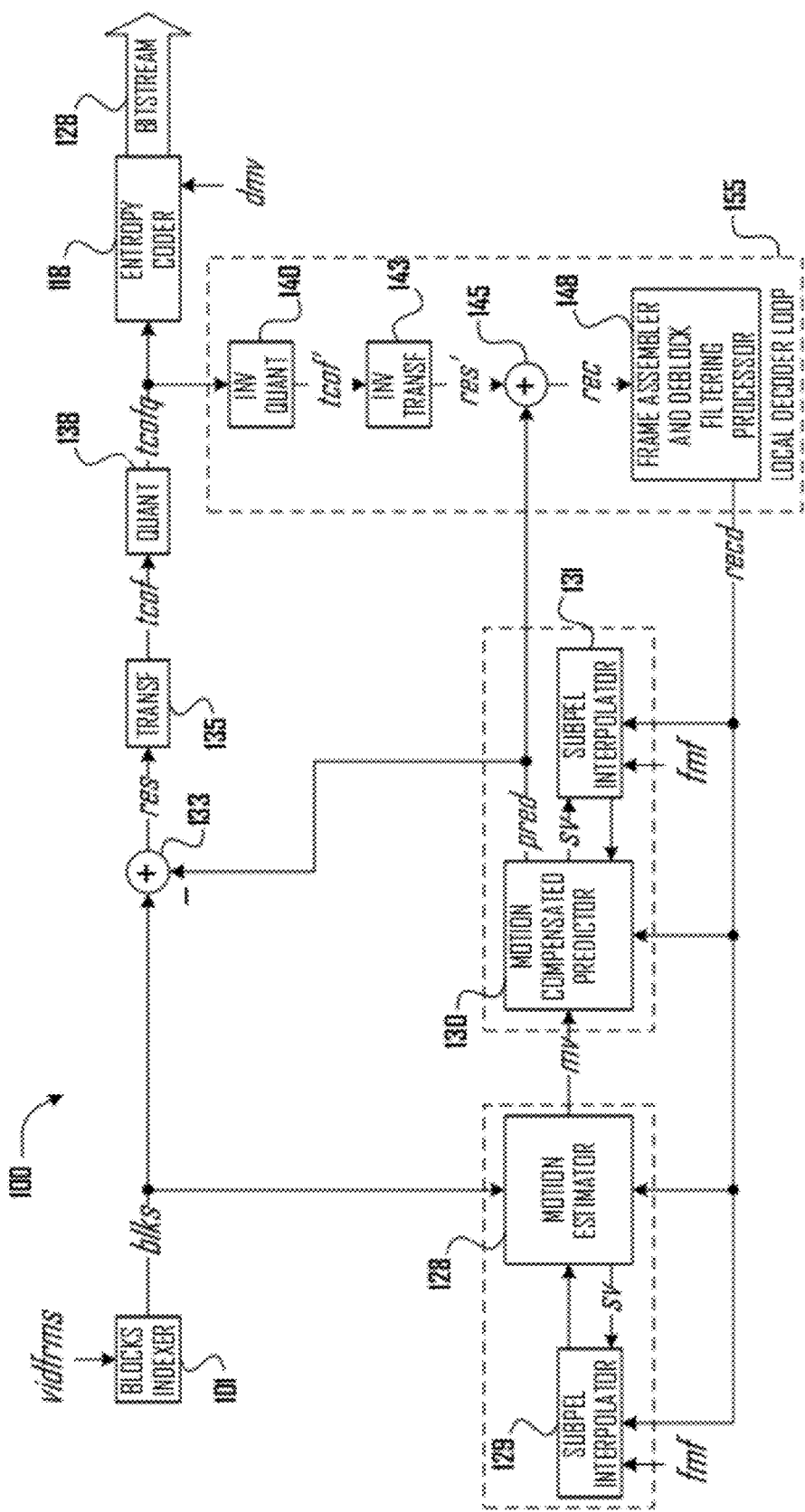
FIG. 1 shows a general block diagram of a prior art interframe encoder employing motion compensated prediction that uses fixed motion filtering.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Overview

Various embodiments of systems and methods for motion filtering for interframe video coding are described. Some of these embodiments may offer reduced computational complexity when compared with existing solutions, as instead of taking many iterations to iteratively calculate filter coefficients during encoding, a motion filter set is looked up from a pre-calculated codebook of motion filter coefficient sets.

In some embodiments, the search complexity may be further reduced by partitioning the complete codebook into a small "base" codebook and a larger "virtual" codebook, such that the main calculations for search only need to be performed on the base codebook. Such embodiments may reduce storage by (a) storing only the base codebook, and an algorithm to synthesize remaining codebook; (b) storing for each filter set, a filter with an appropriate number of taps according to the motion subpel filtering location; and, (c) storing only the needed bit-precision per coefficient.

In various embodiments, the described motion filter codebook techniques may be employed on pictures, slice groups, block maps, merged block maps, or adaptive partitions such as bi-tree, quad-tree, or content dependent regions, or the like. The ability of this technique to work with content dependent partitions also reduces complexity and improves accuracy as compared to other techniques that are driven solely by Rate Distortion Optimization ("RDO"). Various embodiments may be used for subpel filtering only, integer-position filtering only, or both. Further, the codebook can be easily replaced or extended to adapt it to the nature of the content.

Details of filter codebook design and efficient search of codebook are described. With the described method of codebook design and for suggested codebook size, the technique may result in good motion filtering performance, potentially increasing prediction efficiency for a broad spectrum of video content.

In various embodiments, the techniques described may be efficient in bits, as only an index into the codebook may be needed to identify a selected subpel filter set or integer pel filter. In many cases, coding an index may be more efficient than coding actual coefficients or sending differentially encoded filter coefficients. While the number of actual indices sent depends on the number of partitions, compared to existing approaches using same type of partitioning, the described codebook-based techniques may be more efficient in bit-rate.

Various embodiments can be used with typical video coding that use traditional picture structures composed of I-, P-, B-picture coding. Other embodiments may be used with other structures instead or in addition to I- and P-pictures, such as hierarchical B-pictures, unidirectional B-pictures, or other B-picture alternatives.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 shows a general block diagram of a prior art interframe encoder 100 employing motion compensated prediction that uses fixed motion filtering. One or more video frames (vidforms) is divided into blocks (blks) by blocks indexer 101. Blocks (blks) are input one a time to differencer 133 and differenced with corresponding prediction signal blocks (pred), and the residual (res) is forward transformed by transformer 135, resulting in a block of coefficients (tcof) that is then sent to the quantizer 138, resulting in a block of quantized coefficients (tcofq) that are sent both to the entropy coder 118 and the inverse quantizer 140. Inverse quantizer 140 sends de-quantized block of coefficients (tcof') to the inverse transformer 143. At adder 145, the prediction block (pred) from the motion compensation loop is added to the de-quantized residual block (res') at the output of inverse transformer 143. At adder 145, the prediction block (pred) from the motion compensation loop is added to the de-quantized residual block (res') at the output of inverse transformer 743. Adder 745 outputs the locally decoded block (rec), which is then sent to the frame assembler and deblock filter processor 148, which reduces the blockiness. The blocks (recd) at the output of frame assembler and deblock filtering processor 148 form a frame that is used as the reference frame for motion estimator 128 and motion compensated predictor 130.

The motion estimator 128 computes motion vectors (mv) between blocks (blks) of original frame with respect to the reconstructed frame (recd). The process of motion vector computation includes computing an integer pel vector per block, followed by a subpel vector (sv) (to, e.g., ¼ pel resolution) which is computed using subpel interpolator 129. Normally the subpel interpolator 129 is contained within motion estimator 128 itself, but for clarity of illustration it is shown and referred to separately. The motion estimator 128 searches for best match and hence the best motion vector (mv), where as motion compensated predictor 130 uses the motion vector (mv) to generate motion compensated prediction block (pred). The motion compensator 130 also uses a subpel (e.g., to ¼ pel resolution) interpolator 131 like subpel interpolator 129. The filter set (fmf) used by both subpel interpolators 129 and 131 is pre-specified and thus fixed. The entropy coder 118 encodes the quantized transform coefficients (not shown), differential motion vectors (dmv), and overhead data (not shown), generating a compressed bitstream 128.

Figure 2:
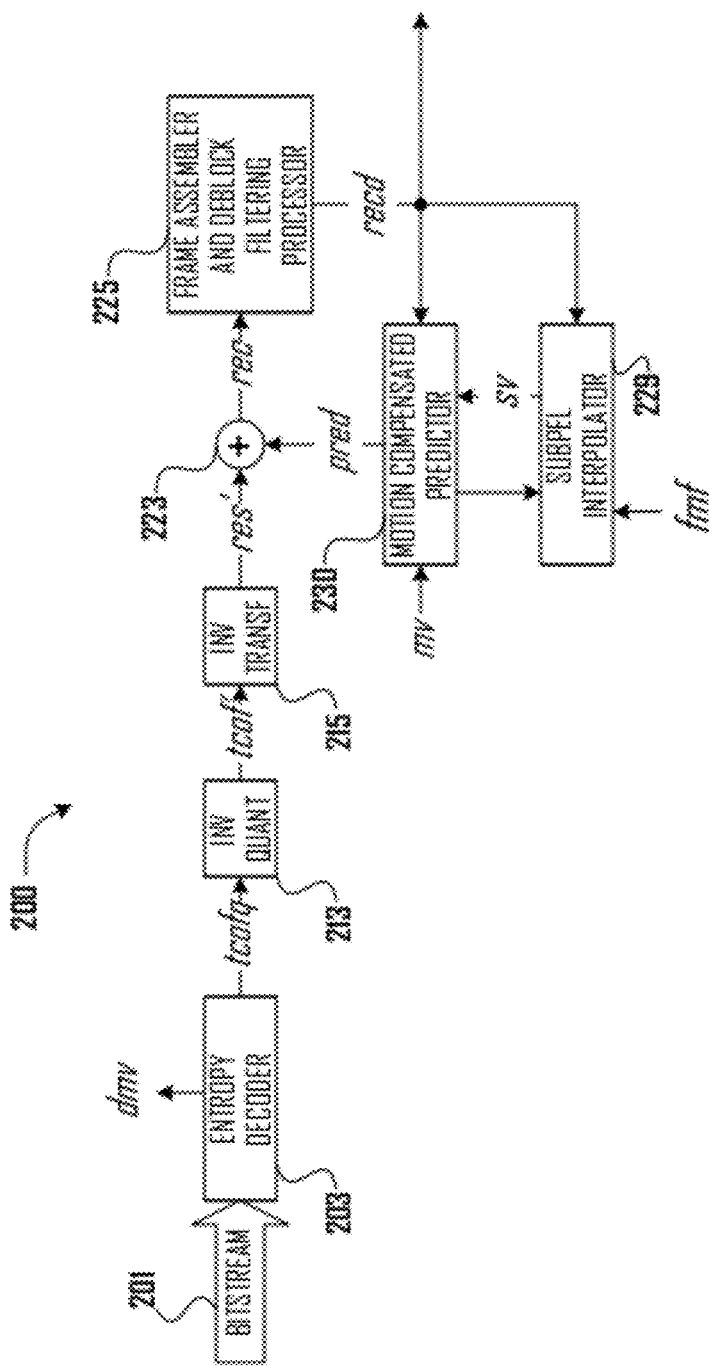
FIG. 2 shows a prior art decoder, corresponding to prior art encoder, and works similarly to the local decoding loop at the encoder.

FIG. 2 shows a prior art decoder 200, corresponding to prior art encoder 100, and works similarly to the local decoding loop 155 at the encoder 100. Specifically, the compressed bitstream 201 to be decoded is input to the entropy decoder 203 which decodes blocks of quantized coefficients (tcofq), differential motion vectors (dmv) and overhead data (not shown). The quantized coefficient blocks (tcofq) are then inverse quantized by inverse quantizer 203, resulting in de-quantized coefficients (tcof'), which are then inverse transformed by inverse transformer 215, resulting in decoded residual blocks (res'). At adder 223, de-quantized coefficients (tcof') are added to motion compensated prediction blocks (prod) obtained by using corresponding motion vectors (mv) at motion compensated predictor 230, using subpel vector (sv) (to, e.g., ¼ pel resolution), which is computed using subpel interpolator 229. The resulting decoded video (rec) is deblocked in frame assembler and deblocking filter 225, and just as at the encoder 100, the deblocked video (recd) is used as a reference frame. The motion compensated predictor 230 at the decoder 200 works similarly to the motion compensated predictor 130 at the encoder 100, such as motion compensated predictor 230 uses a similar subpel interpolator 229 with the same fixed motion filter (fmf) as that used by the encoder 100.

Figure 3:
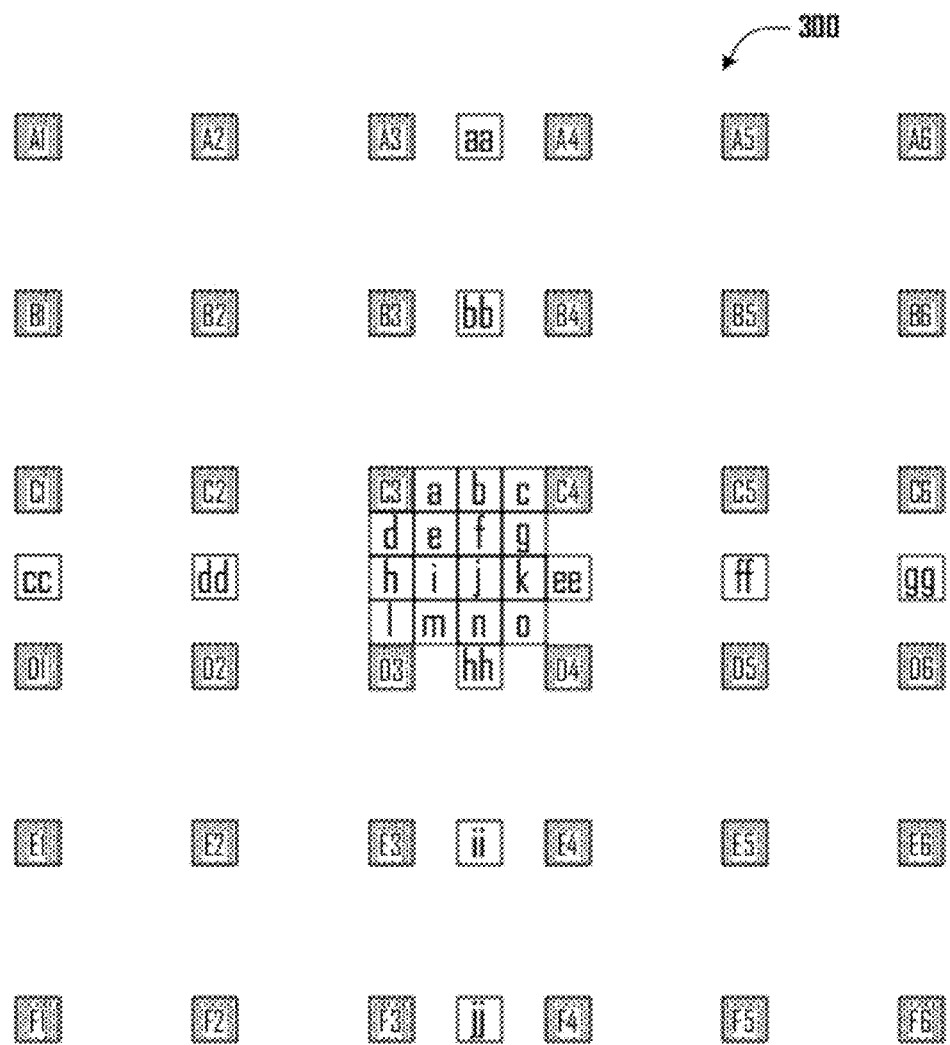
FIG. 3 shows a portion of a video frame organized as a pixel-grid that is further divided into subpel grid, at which a motion compensated prediction block is calculated.

FIG. 3 shows a portion 300 of a video frame organized as a pixel-grid that is further divided into subpel grid, at which a motion compensated prediction block is calculated. The integer pixel locations are shown as A1-A6, B1-B6, C1-C6, D1-D6, E1-E6, and F1-F6. The ¼ pel locations between C3-C4, and D3-D4 are shown by positions {a, b, c, d, e, f g, h, i, j, k, l, m, n, o} such that each block can be compensated at one of these quarter pel positions. FIG. 3 also shows several ½ pel locations at positions aa, bb, cc, dd, ee, ff, gg, hh, ii, and jj. Other embodiments may use eighth-pel subpel locations (not shown).

Calculation of filter-sets for subpel positions {a, b, c, d, e, f g, h, i, j, k, l, m, n, o} is performed using either 6-tap or 9-tap filters. The filter coefficients are mapped to a 6×6 matrix which is used to compute the subpel value from the 6×6 neighborhood of surrounding pels (A1-F6).

Figure 4C:
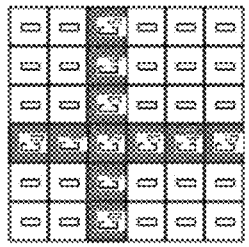
FIGS. 4a-o show a mapping of 6/9-taps into a 6×6 filter matrix for each subpel position.
Figure 4D:
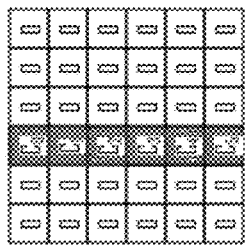
Figure 4E:
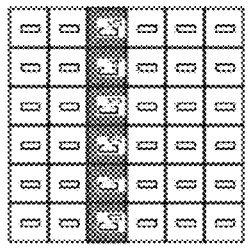
Figure 4B:
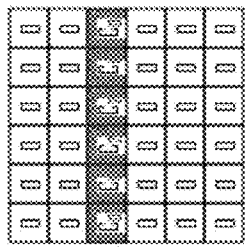
Figure 4A:
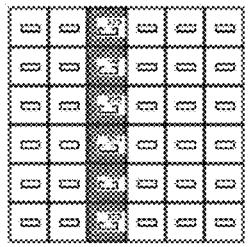
Figure 4J:
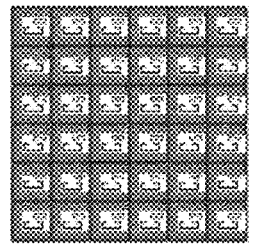
Figure 4I:
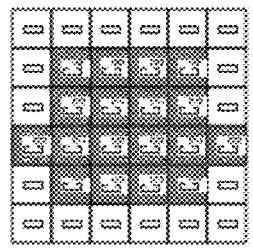
Figure 4H:
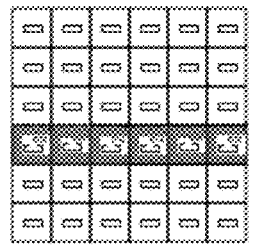
Figure 4G:
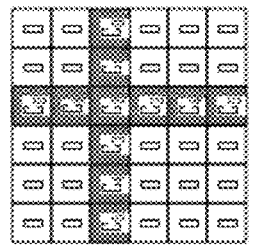
Figure 4F:
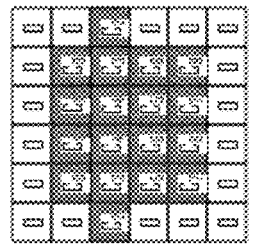
Figure 4O:
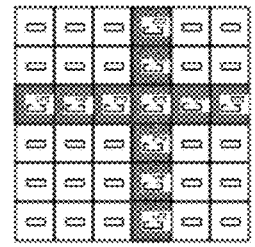

FIGS. 4a-o show a mapping of 6/9-taps into a 6×6 filter matrix for each subpel position.

FIG. 4a shows filter coefficients and pixels on which they are applied to directly compute the filtered interpolation block at subpel position {a}; this position requires 6 filter coefficients.

FIG. 4b shows filter coefficients and pixels on which they are applied to directly compute the filtered interpolation block at subpel position {b}; this position corresponds to horizontal half pel position and requires only 3 filter coefficients due to symmetry.

FIG. 4c shows filter coefficients and pixels on which they are applied to directly compute the filtered interpolation block at subpel position {c}; this position requires 6 filter coefficients.

FIG. 4d shows filter coefficients and pixels on which they are applied to directly compute the filtered interpolation block at subpel position {d}; this position requires 6 filter coefficients.

FIG. 4e shows filter coefficients and pixels on which they are applied to directly compute the filtered interpolation block at subpel position {e}; this position requires 6 filter coefficients.

FIG. 4f shows filter coefficients and pixels on which they are applied to directly compute the filtered interpolation block at subpel position {f}; this position requires 9 filter coefficients.

FIG. 4g shows filter coefficients and pixels on which they are applied to directly compute the filtered interpolation block at subpel position {g}; this position requires 6 filter coefficients.

FIG. 4h shows filter coefficients and pixels on which they are applied to directly compute the filtered interpolation block at subpel position {h}; this position corresponds to vertical half pel position and due to symmetry only requires 3 coefficients.

FIG. 4i shows filter coefficients and pixels on which they are applied to directly compute the filtered interpolation block at subpel position {i}; this position requires 9 filter coefficients.

FIG. 4j shows filter coefficients and pixels on which they are applied to directly compute the filtered interpolation block at subpel position {j}; this position requires 9 filter coefficients.

Figure 4N:
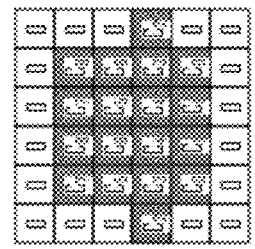
Figure 4M:
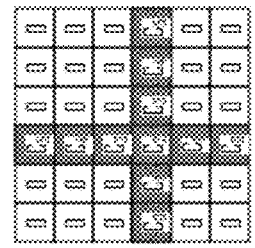
Figure 4L:
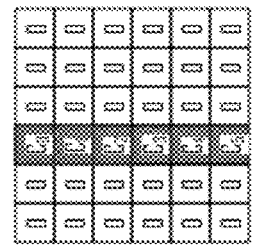
Figure 4K:
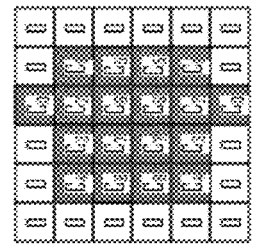

FIG. 4k shows filter coefficients and pixels on which they are applied to directly compute the filtered interpolation block at subpel position {k}; this position requires 9 filter coefficients.

FIG. 4l shows filter coefficients and pixels on which they are applied to directly compute the filtered interpolation block at subpel position {l}; this position requires 6 filter coefficients.

FIG. 4m shows filter coefficients and pixels on which they are applied to directly compute the filtered interpolation block at subpel position {m}; this position requires 6 filter coefficients.

FIG. 4n shows filter coefficients and pixels on which they are applied to directly compute the filtered interpolation block at subpel position {n}; this position requires 9 filter coefficients.

FIG. 4o shows filter coefficients and pixels on which they are applied to directly compute the filtered interpolation block at subpel position {o}; this position requires 6 filter coefficients.

Adaptive Wiener Filtering

Before discussing details of FIG. 5, the theory of optimal filtering is briefly discussed, as that is the basis of adaptive filter design using the wiener filtering method.

For each of the subpel locations, cross-correlation and autocorrelation matrices are accumulated, from which the optimal wiener filter set can be computed by solving the Weiner Hopf equation as follows.

Let x(n) be the input signal, y(n) be the output, and h(n) represent filter coefficients.

$$\text{Filter output: } y(n) = \sum_{k=0}^{N-1} h(k)x(n-k)$$

$$\text{Error signal: } e(n) = d(n) - y(n)$$

$$\text{Mean Square Error: } J = E[e^2(n)]$$

$$\text{In vector form: } x(n) = \begin{bmatrix} x(n) \\ x(n-1) \\ \vdots \\ x(n-N+1) \end{bmatrix} \text{ and } h = \begin{bmatrix} h(0) \\ h(1) \\ \vdots \\ h(N-1) \end{bmatrix}$$

$$y(n) = h^T x(n) = x(n)^T h$$

$$E[e^2(n)] = E[(d(n) - y(n))^2]$$
$$= E[d^2(n)] - 2E[d(n)x(n)^T]h + h^T E[x(n)x(n)^T]h$$
$$= P_d - 2R_{dx}^T h + h^T R_{xx} h$$

Where, $P_d$ is a scalar.
Crosscorrelation row vector: $R_{dx} = E[d(n)x(n)^T]$
Autocorrelation matrix: $R_{xx} = E[x(n)x(n)^T]$
To find minimum, the derivative is taken and set it to zero as follows:

$$\frac{\partial E[e^2(n)]}{\partial h(k)} = -2R_{dx}^T + 2R_{xx} h = 0$$

Now solving for h, the Wiener Hopf equation is as follows:

$$h = R_{xx}^{-1} R_{dx}$$

The Wiener Hopf equation determines optimum filter coefficients in mean square error, and the resulting filter is called the 'wiener' filter.

In the above equation, h is the vector of filter coefficients (typically 6 or 9 coefficients), $R_{xx}$ is the autocorrelation matrix (for block data of reference frame) and $R_{dx}$ is a cross-correlation matrix/row vector (between the source frame and reference frame block data). The matrices are accumulated for each subpel position separately, and hence h can be computed by solving the aforementioned equation for each subpel position, thus obtaining the adapted filter set of 16 filters (for ¼ pel locations).

FIG. 5 shows a block diagram of a prior art interframe encoder 500 employing motion compensated predictor that uses generalized adaptive motion filtering. The blocks indexer 501, forward transform 535, quantizer 538, inverse quantizer 540, inverse transform 543, frame assembler and deblock filtering processor 548, and entropy coder 518 work the same way as the corresponding components of encoder 100, as shown in FIG. 1 and discussed above, and their descriptions need not be reiterated here. Similarly, the motion estimator 528 and motion compensator 530 works the same way as motion estimator 128 and motion compensator 130, discussed above, except for filter sets they use. Here, the focus is motion filtering, and only this subsystem is discussed in detail.

Unlike H.264, which uses a fixed filter set, encoder 500 computes a filter set from the data. This computation takes place in subpel (wiener) iterative filter set computer 558, using the wiener hopf equations discussed earlier. The process starts with use of a default filter set to compute lowest Sum of Absolute Differences ("SAD") position for each block, which reflects the best match subpel match position. In the next iteration, using these subpel positions, a new filter set is computed, which when used provides updated subpel locations. The process is iterative and thus several iterations (4-20) may be needed for the process to converge. The process is compute-intensive due to the complexity of evaluation at each iteration. In some cases, it is possible to limit the number of iterations, trading off complexity for performance. The computed adaptive motion filter set (amf) is provided to subpel interpolator 531 at motion compensated predictor 530. This filter set (amf) also needs to be encoded and sent via the bitstream to the decoder. Since the filter set (amf) can use as many as 99 filter coefficients, efficient encoding of filter set is important. Typical techniques range from sending filter set for most significant positions, differential coding of coefficients (dmf) (generated by differencer 560), suppression of coefficients that did not change much since last time they were sent, and the like. Assuming that filter coefficients can be coded efficiently, multiple filter sets may be sent per picture with the goal of choosing between two or more filter sets for higher efficiency; this operation is performed in spatial partitioner and partitions encoder 505, which generates a partition map (ptmap). Rate distortion optimizer 508 is often used to ensure that even when using multiple filters and associated overhead, gain will still result.

Figure 6:
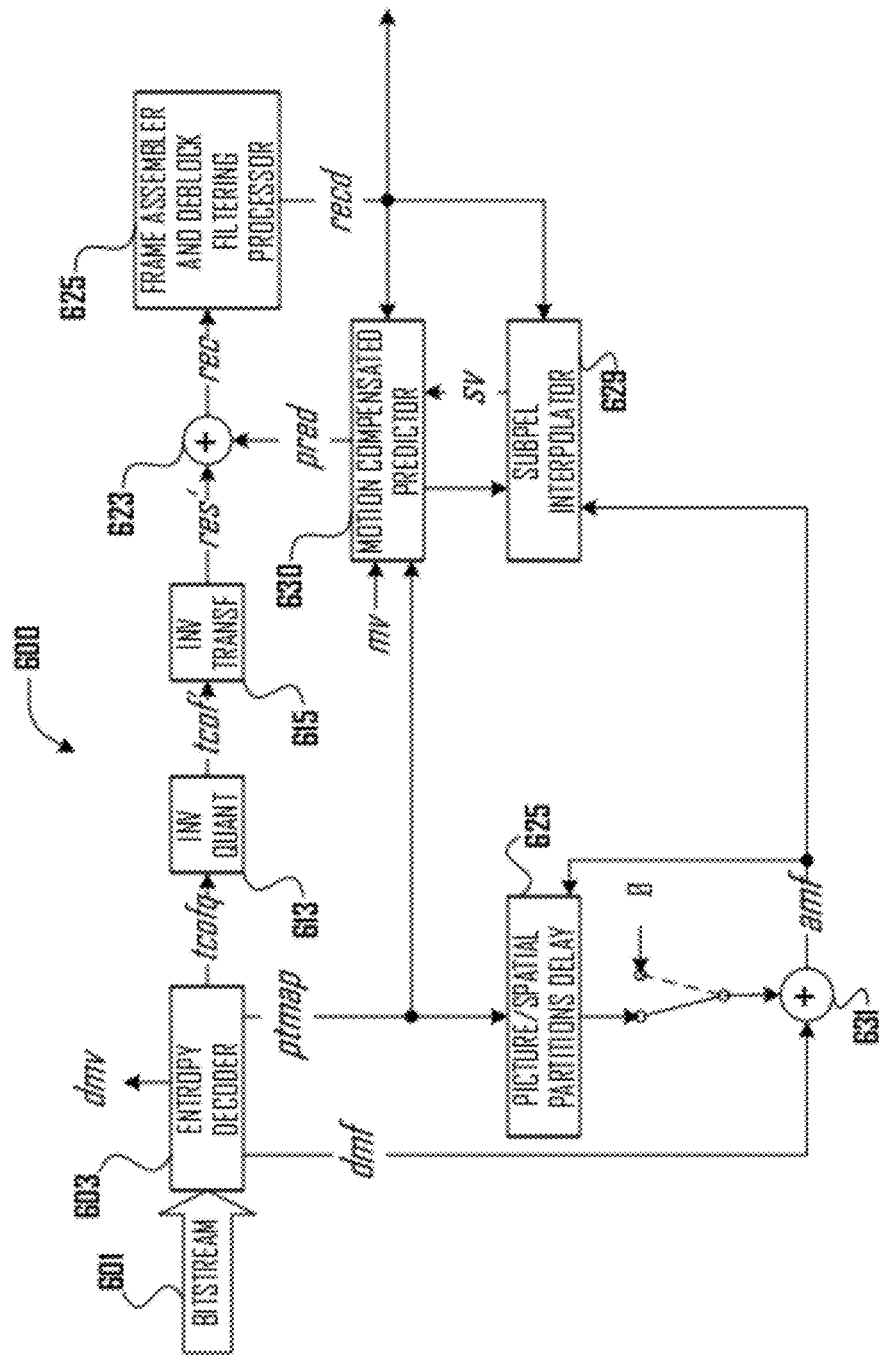
FIG. 6 shows block diagram of a prior art interframe decoder employing motion compensated predictor that uses generalized adaptive motion filtering.

FIG. 6 shows block diagram of a prior art interframe decoder 600 employing motion compensated predictor that uses generalized adaptive motion filtering. The entropy decoder 603, inverse transform 615, inverse quantizer 613, and frame assembler and deblock filtering processor 625 work the same way as the corresponding components of decoder 200, as shown in FIG. 2 and discussed above, and their descriptions need not be reiterated here. Similarly, the motion compensated predictor 630 works the same way as motion compensated predictor 230, discussed above, except for filter sets used. Here, the focus is motion filtering, and only this subsystem is discussed in detail.

The entropy decoder 603 decodes a codeword (dmf) decoding the differential value of the motion filter to which a filter set representing prediction is added at adder 631, resulting in a coefficient filter set (amf). This filter set (amf) is provided to subpel interpolator 629 in motion compensated predictor 630. Further, in case multiple filters are used, a partition map (ptmap) may be decoded so that the filter (amf) can be applied to the correct portion of the picture.

Figure 7B:
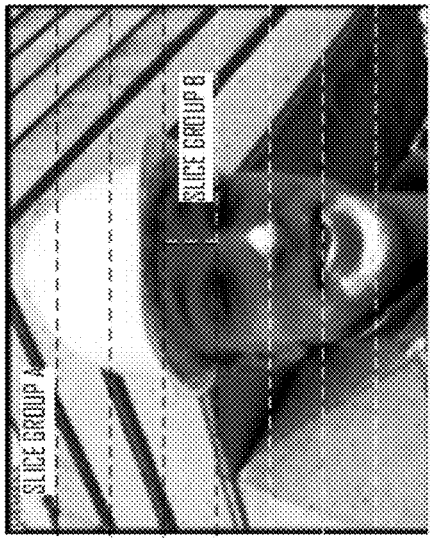
FIGS. 7a-f show various partitioning modes for dividing a picture.
Figure 7C:
Figure 7A:
Figure 7E:
Figure 7F:
Figure 7D:

FIGS. 7a-f show various partitioning modes for dividing a picture. For instance, FIG. 7a represents picture based partitioning where filter codes are only switched on a picture-by-picture basis. FIG. 7b shows slice or slice-group based partitioning such that a first filter set is applied on slice group 'A', and a second filter set is applied on slice group 'B'. FIG. 7c represents a block map that identifies which filter to use for block type 'A' and which filter to use for block type 'B'. FIG. 7d shows division of a picture into tiles and further division of tiles into bi-tree partitions such that various cuts of bi-tree based on rate-distortion optimization ("RDO") are labeled as 'A' or 'B', indicating that they may correspondingly use a first or a second filter set. Likewise, FIG. 7e shows partitioning of a picture into tiles, and further partitioning of a tile into two types of quad-tree partitions labeled as 'A or 'B' such that they may correspondingly use a first or a second filter set. Finally, FIG. 7f shows regions that result from merging of slices, or merging of blocks, or merging of bi-tree, or merging of quad-tree partitions, or purely by spatial segmentation.

Figure 8:
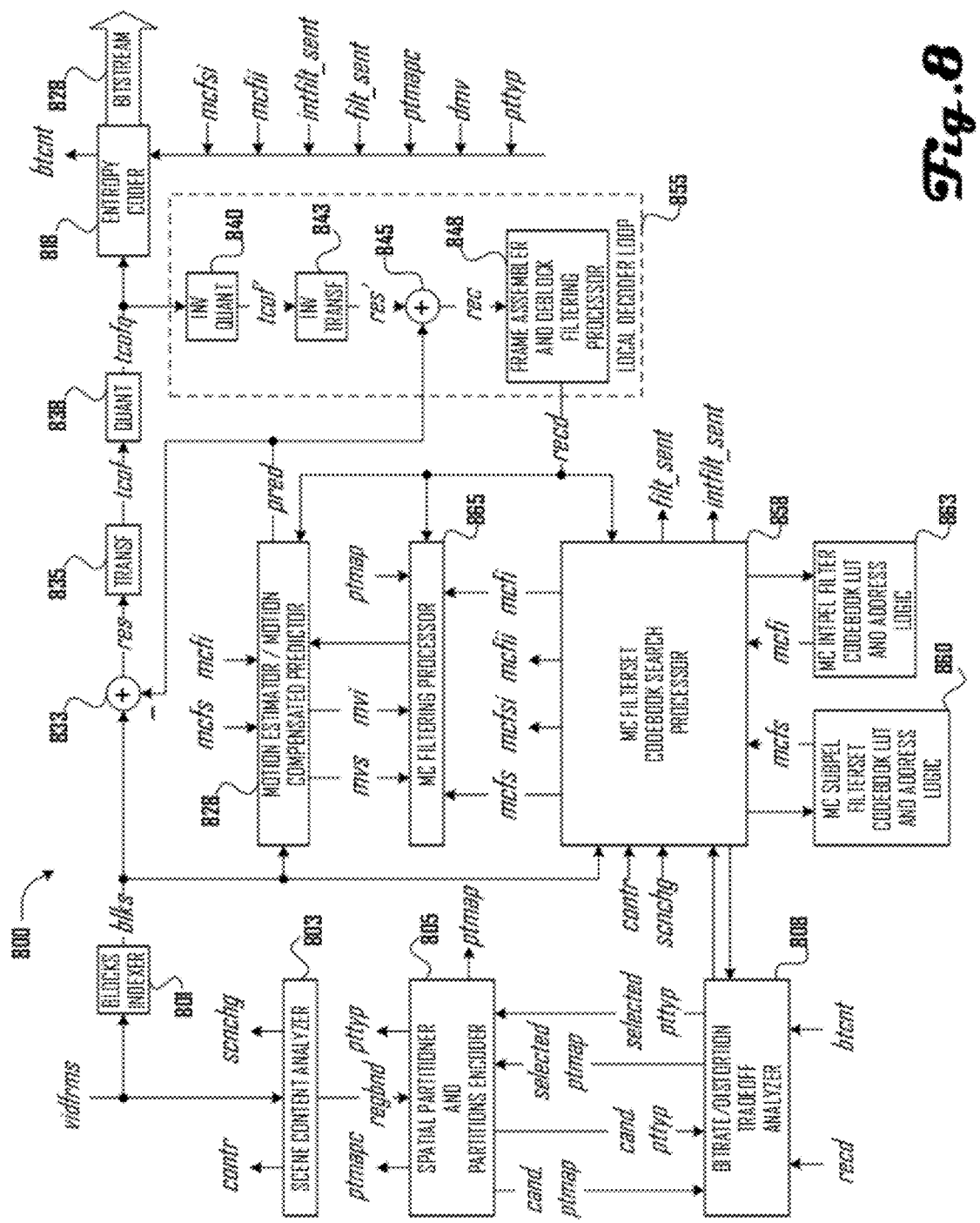
FIG. 8 shows a block diagram of an interframe encoder employing motion compensated predictor that uses motion filtering codebook encoder in accordance with one embodiment.

FIG. 8 shows a block diagram of an interframe encoder 800 employing motion compensated predictor that uses motion filtering codebook encoder in accordance with one embodiment. The blocks indexer 801, forward transform 835, quantizer 838, inverse quantizer 840, inverse transform 843, frame assembler and deblock filtering processor 848, and entropy coder 818 work the same way as the corresponding components of encoder 100, as shown in FIG. 1 and discussed above, and their descriptions need not be reiterated here. Similarly, the motion estimator 828 and motion compensator 830 work the same way as motion estimator 128 and motion compensator 130 discussed above, except for filter sets they use. Here, the focus is motion filtering, and only this subsystem is discussed in detail.

Compared to existing adaptive motion filtering encoders, the codebook-based motion filtering encoder 800 selects a filter set from an existing codebook instead of computing the motion filter explicitly. In one embodiment, two types of codebooks are used, one that stores subpel filter sets 860 and one that stores integer-position filters 863. MC Filter set Codebook Search Processor 858 allows efficient search of the respective codebooks yielding subpel and integer-position codebook indices, (mcfsi) and (mcfii), that correspondingly refer to subpel filter set (mcfs) and integer-position filter (mcfi).

In various embodiments, the subpel filter set (mcfs) and integer-position filter (mcfi) can be sent on a picture (once only) or on a spatial partition (multiple times per picture) basis. In various embodiments, any type of spatial partitions can be used, such as slice, variable block size, block, bi-tree, quad-tree, region, tile, and the like (see, e.g., FIGS. 7a-f). This partitioning is performed by spatial partitioner and partitions encoder 805. The specifics of partitioning such as number of partitions to be sent are decided based on rate distortion analysis by bitrate/distortion tradeoff analyzer 808, as well as scene content analyzer 803. The best match subpel filter set and integer pel filter set are sent in the bitstream to decoder. The subpel filter set (mcfs) and integer-position filter (mcfi)

are provided to MC Filtering Processor 865 to generate motion compensated prediction at motion estimator/motion compensated predictor 828. In some embodiments, the process may be efficient in search, as well as in bit cost for representing of filters/filter sets by indices.

Figure 9:
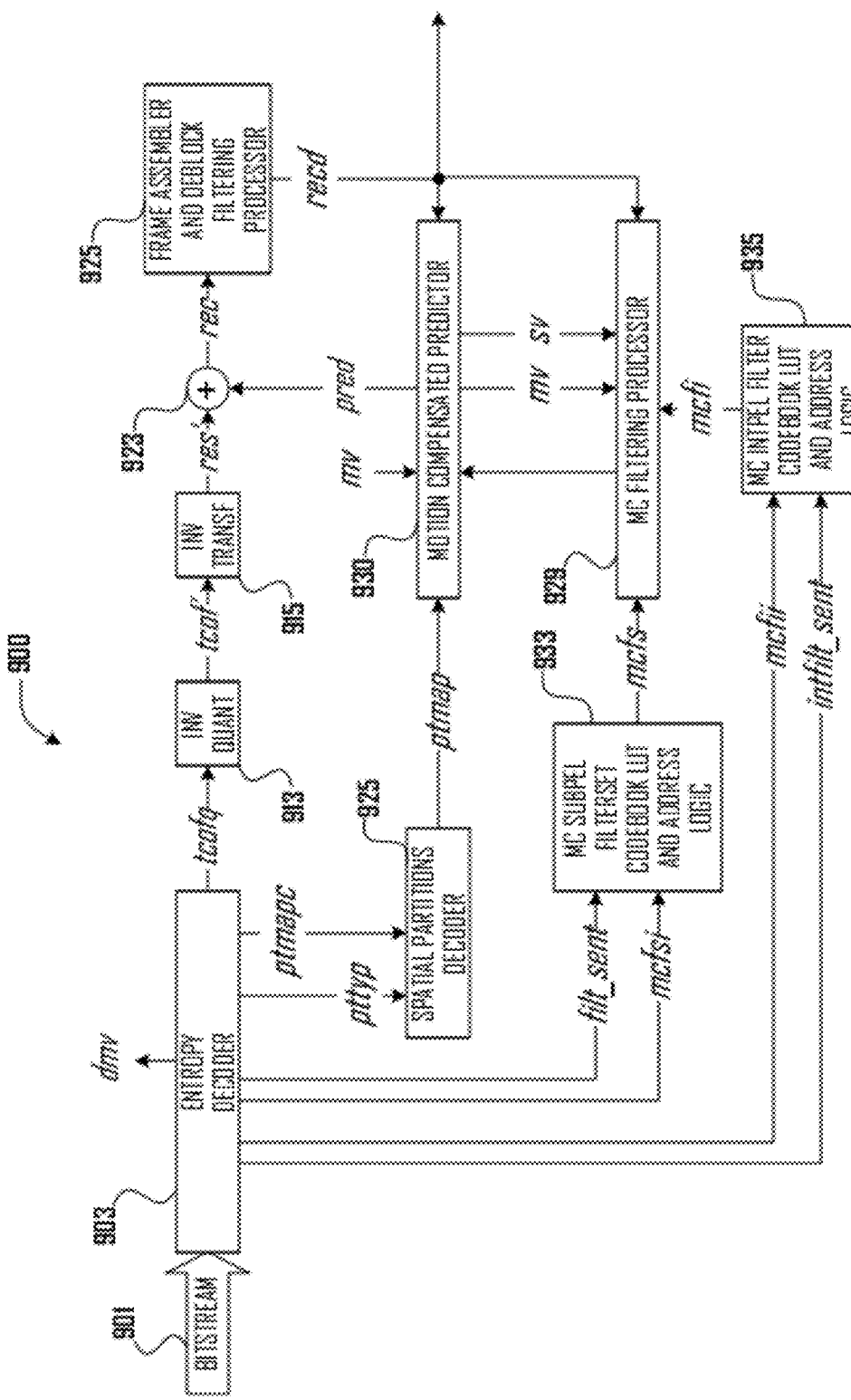
FIG. 9 shows a block diagram of an interframe decoder employing motion compensated predictor that uses motion filtering codebook decoder in accordance with one embodiment.

FIG. 9 shows a block diagram of an interframe decoder 900 employing motion compensated predictor that uses motion filtering codebook decoder in accordance with one embodiment. The entropy decoder 903, inverse transform 915, inverse quantizer 913, and frame assembler and deblock filtering processor 925 work the same way as the corresponding components of decoder 200, as shown in FIG. 2 and discussed above, and their descriptions need not be reiterated here.

Similarly, the motion compensated predictor 930 works the same way as motion compensated predictor 230, discussed above, except for filter sets used. Here, the focus is motion filtering, and only this subsystem is discussed in detail.

The entropy decoder 903 entropy decodes bitstream 901 to obtain codebook subpel motion filter index (mcfsi) and/or integer-position motion filter index (mcfsi). These indices (mcfsi) and (mcfii) are used to access the desired subpel filter set (mcfs) and/or integer-position filter (mcfi) from subpel codebook 933 and/or integer-position codebook 935. The resulting subpel filter set mcfs and/or intpel filter mcfi are provided to MC Filtering Processor 929 that performs the subpel interpolation and/or integer pel filtering to generate motion compensated prediction (pred). In some embodiments, flags (filt_sent) and (intfilt_sent) may further be decoded by entropy decoder 903, indicating whether the bitstream 901 includes subpel motion filter index (mcfsi) and integer-position motion filter index (mcfii), respectively.

Table 1 shows two sample filter sets (id=0 and id=1) from an exemplary subpel "base" codebook. In one embodiment, the subpel "base" codebook may include 16 "base" subpel filter sets (each including 15 or 16 subpel-position filters in the case of ¼ pel filtering, or 63 or 64 filters in the case of eighth-pel filtering). Individual subpel-position filters from the 16 "base" subpel filter sets may be used in different pre-determined combinations to create a "virtual" codebook. In one embodiment, the "virtual" codebook may include 256 subpel filter sets. In other embodiments, the "base" and "virtual" codebooks may include more or fewer filter sets.

TABLE 1

Subpel (¼ pel) a-o Positions Base Codebook subset

| | | | Filter Set id = 0 | | | | | | |
|---|---|---|---|---|---|---|---|---|---|
| $a_0$ | 8 | −31 | 217 | 83 | −33 | 12 | | | |
| $b_0$ | 14 | −39 | 153 | 153 | −39 | 14 | | | |
| $c_0$ | 15 | −30 | 68 | 216 | −15 | 2 | | | |
| $d_0$ | −12 | 20 | 187 | 83 | −25 | 3 | | | |
| $e_0$ | 10 | −41 | 202 | 112 | −34 | 7 | | | |
| $f_0$ | 23 | −123 | 89 | −278 | 1004 | −60 | 421 | 1 | −53 |
| $g_0$ | 15 | −56 | 186 | 128 | −24 | 7 | | | |
| $h_0$ | −1 | −19 | 148 | 148 | −19 | −1 | | | |
| $i_0$ | −13 | 21 | −73 | −8 | 6 | −141 | 890 | 469 | −127 |
| $j_0$ | 19 | −20 | 16 | −55 | 48 | −130 | 103 | −214 | 745 |
| $k_0$ | 41 | 3 | −169 | −61 | −1 | −115 | 954 | 466 | −94 |
| $l_0$ | −2 | −6 | 77 | 210 | −24 | 1 | | | |
| $m_0$ | 6 | −39 | 202 | 103 | −25 | 9 | | | |
| $n_0$ | −11 | −74 | 118 | −369 | 1071 | 66 | 332 | −15 | −94 |
| $o_0$ | 19 | −53 | 162 | 169 | −56 | 15 | | | |
| | | | Filter Set id = 1 | | | | | | |
| $a_1$ | 39 | 25 | 59 | 72 | 26 | 35 | | | |
| $b_1$ | 38 | 27 | 63 | 63 | 27 | 38 | | | |
| $c_1$ | −58 | −3 | 27 | 112 | 57 | 121 | | | |
| $d_1$ | −121 | 82 | 294 | 91 | −61 | −29 | | | |
| $e_1$ | −23 | 69 | 42 | 147 | −2 | 23 | | | |
| $f_1$ | −71 | 73 | 131 | 226 | 470 | 212 | 300 | −172 | −145 |
| $g_1$ | 18 | 203 | 237 | −46 | 246 | −402 | | | |
| $h_1$ | −430 | 338 | 220 | 220 | 338 | −430 | | | |
| $i_1$ | −525 | −42 | 196 | 101 | −92 | 218 | 244 | 461 | 463 |
| $j_1$ | −884 | −102 | −53 | 378 | 105 | 240 | 270 | 138 | 420 |
| $k_1$ | 128 | 4230 | −1742 | 1603 | −3906 | 766 | −1538 | 1578 | −93 |
| $l_1$ | −232 | 176 | 76 | 109 | 233 | −106 | | | |
| $m_1$ | 37 | 47 | 85 | 121 | 72 | −106 | | | |
| $n_1$ | 14 | 99 | 300 | 166 | 355 | 211 | 331 | −206 | −246 |
| $o_1$ | 49 | 16 | 55 | 61 | 8 | 67 | | | |
| | | | Filter Set id = 2 | | | | | | |
| $a_3$ ... | . | . | . | . | . | . | . | . | . |
| | . | . | . | . | . | . | . | . | . |

Of the exemplary filter sets show in Table 1, filter set id=0 corresponds to a sharp scene, and filter set id=1 corresponds to a blurrier scene.

In some embodiments, a subpel codebook such as that shown (in part) in Table 1 can be equivalently characterized as including a multiplicity of motion-compensation filters grouped into a plurality of subpel-position groups that respectively correspond to the plurality of subpel positions, each of the plurality of subpel-position groups comprising a plurality of motion-compensation filters suitable for interpolating blocks of a picture at a corresponding one of the plurality of subpel positions. For example, the codebook shown in Table 1 can be characterized as including 15 or 16 groups of motion-compensation filters corresponding to subpel positions {a-o}, e.g.:

*subpel* position {a} group: {$a_0, a_1, a_2 \ldots a_{15}$};

*subpel* position {b} group: {$b_0, b_1, b_2 \ldots b_{15}$};

$\vdots$

*subpel* position {o} group: {$o_0, o_1, o_2 \ldots o_{15}$}.

The codebook may be further characterized as including several (e.g., 256) pre-determined subsets of motion-compensation filters, one from each subpel position group, e.g.:

subset id = 0: {$a_0, b_0, c_0, d_0, e_0, f_0, g_0, h_0, i_0, j_0, k_0, l_0, m_0, n_0, o_0$};

subset id = 1: {$a_1, b_1, c_1, d_1, e_1, f_1, g_1, h_1, i_1, j_1, k_1, l_1, m_1, n_1, o_1$};

$\vdots$ subset id = 15:

{$a_{15}, b_{15}, c_{15}, d_{15}, e_{15}, f_{15}, g_{15}, h_{15}, i_{15}, j_{15}, k_{15}, l_{15}, m_{15}, n_{15}, o_{15}$};

subset id = 16: {$a_0, b_5, c_7, d_9, e_4, f_4, g_{12}, h_6, i_7, j_2, k_4, l_{11}, m_8, n_0, o_{10}$};

$\vdots$ subset id =

255: {$a_{10}, b_6, c_{12}, d_9, e_2, f_2, g_3, h_{10}, i_3, j_5, k_1, l_8, m_{11}, n_6, o_{10}$}.

In some embodiments, the codebook may further include a group of integer-position filters, e.g., integer-position group {0}: {$0_0, 0_1, 0_2 \ldots 0_{15}$}. In such embodiments, the pre-determined subsets of motion-compensation filters may also include an integer-position filter, e.g.: subset id=0: {$0_0, a_0, b_0, c_0, d_0, e_0, f_0, g_0, h_0, i_0, j_0, k_0, l_0, m_0, n_0, o_0$}; subset id=1: {$0_1, a_1, b_1, c_1, d_1, e_1, f_1, g_1, h_1, i_1, j_1, k_1, l_1, m_1, n_1, o_1$}; and so on.

In some embodiments, integer-position filters may be included in an integer-position codebook. Table 2 shows two sample integer-position filters (id=0 and id=1) from an exemplary integer-position codebook. In one embodiment, the integer-position codebook may include 48 integer-position filters. In other embodiments, the integer-position codebook may include more or fewer filters. In some embodiments, integer-position filters may also be included within the subpel filter sets of the subpel filter codebook, instead of or in addition to the integer-position codebook.

TABLE 2

| Integer-Position Codebook subset | | | | | | | | | |
|---|---|---|---|---|---|---|---|---|---|
| Filter id = 0 | | | | | | | | | |
| 0 | −58 | 162 | 48 | 51 | 309 | 103 | 15 | 252 | 142 |
| Filter id = 1 | | | | | | | | | |
| 0 | −32 | 10 | 54 | 196 | 519 | 280 | 65 | 31 | −99 |
| Filter id = 2 | | | | | | | | | |
| . | . | . | . | . | . | . | . | . | . |
| . | . | . | . | . | . | . | . | . | . |
| . | . | . | . | . | . | . | . | . | . |

Figure 10:
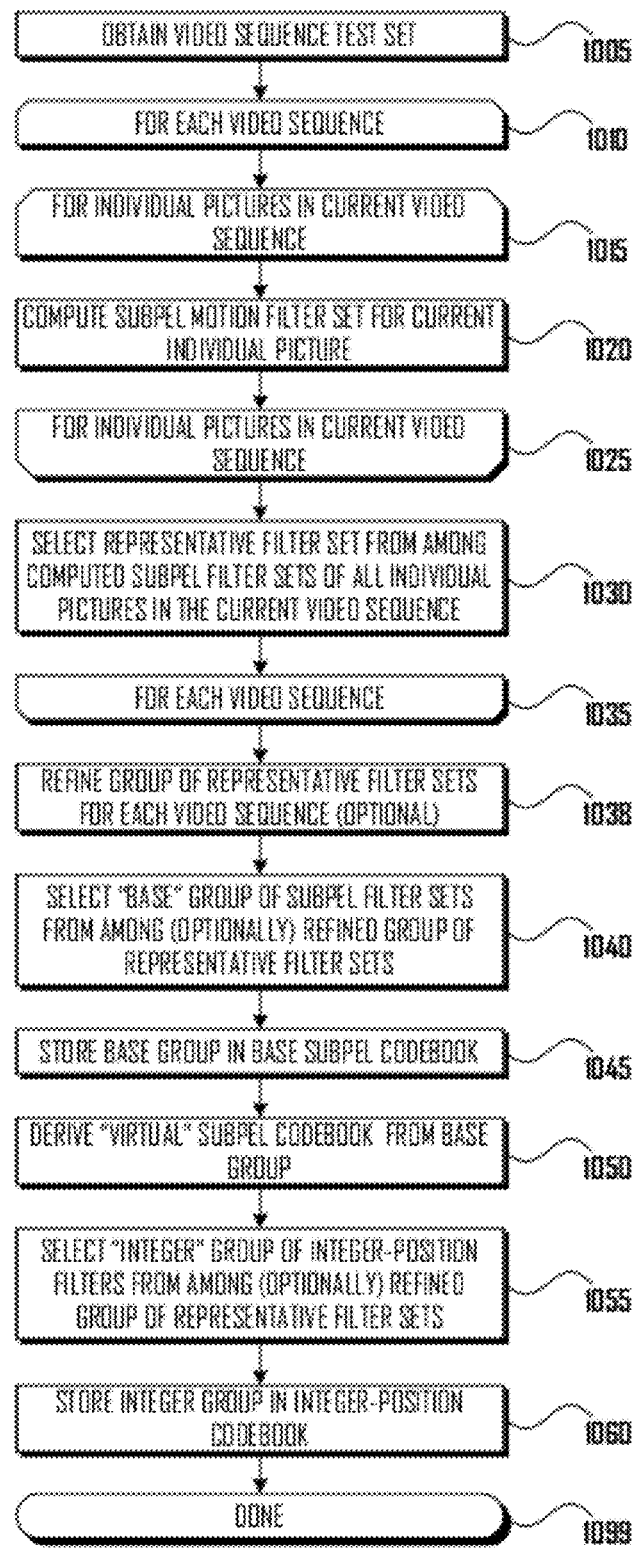
FIG. 10 shows an 'offline' routine for generating a motion filter codebook or codebooks for subpel and integer pel locations.

FIG. 10 shows an 'offline' routine 1000 for generating a motion filter codebook or codebooks for subpel and integer pel locations. In block 1005, routine 1000 obtains a test set including one or more sample video sequences. In some embodiments, the video sequences are selected to have combinations of different degrees of motion and a variety of nearly uniform texture. In one embodiment, the test sequences are chosen such that they contain texture-like regions, which typically need more precise filtering in order to achieve the desired coding gain. In one embodiment, a number of standard CIF sequences may be employed as sample video sequences.

Beginning in starting loop block 1010, routine 1000 processes each video sequence in the test set. Beginning in starting loop block 1015, routine 1000 processes one or more individual pictures or frames of the current video sequence. In block 1020, routine 1000 applies Wiener filter based adaptive motion filtering to compute a fully adapted filter set for the current picture or frame. In some embodiments, to derive better filter sets, two or more iterations may be performed, meaning that the computation of filter coefficients and update of subpel locations may be iteratively performed two or more times (the first time subpel collations are set to standard filter results, and in each subsequent iteration the positions are set to the ones obtained with the previously computed filter set). In ¼ pel embodiments, a filter set thus generated consists of 16 filters since a filter is computed per each ¼ pel location, as well as for the integer-position location. In eighth-pel embodiments, a filter set thus generated may consist of 64 filters. In one embodiment, each individual filter in the generated filter set has either 6 or 9 taps depending on the subpel location.

In ending loop block 1025, routine 1000 iterates back to block 1015 to process another individual picture or frame of the current video sequence (if any). In block 1030, routine 1000 selects a representative filter set for the current video sequence from the generated filter sets. In one embodiment, selecting a representative filter set may include applying all of the computed filter sets to each picture or frame of the video sequence and selecting a filter set that has a high (or the highest) coding gain (i.e., has a low SAD or the lowest SAD). In some embodiments, the representative set may be selected according to a subset of pictures or frames of the current video sequence (e.g., the first N frames).

In ending loop block 1035, routine 1000 iterates back to block 1010 to process the next video sequence in the test set (if any). In one embodiment, after all video sequences have been processed, up to 100 or more representative filter sets may have been generated and selected. In block 1038, routine 1000 optionally refines the collection of representative filter sets. For example, in one embodiment, a random walk algorithm (or a similar optimization algorithm) may be employed to test random combinations of filters on some or all of the video sequences to further improve the overall coding gain provided by the collection of refined filter sets over the course of hours or even days.

In block 1040, routine 1000 selects a "base" group of subpel filter sets having high or the highest coding gain among the optionally refined collection of filter sets. In block 1045, routine 1000 stores the selected "base" group of filter sets in a subpel codebook.

In block 1050, routine 1000 derives a "virtual" codebook from the individual filters from the selected "base" group of filter sets. In one embodiment, a random walk algorithm (or a similar optimization algorithm) may be employed to test various combination of individual filters from the selected "base" group of filter sets. In one embodiment, 256 different combinations of filters may be derived from the selected "base" group of filter sets. The derived combinations are stored to create a "virtual" codebook that can be derived from filters of the selected "base" group of filter sets.

In block 1055, a group of integer-position filters is selected from among the optionally refined collection of filter sets. In one embodiment, the integer-position filters may be selected to have high coding gain and to differ from one another. In one embodiment, 48 integer-position filters may be selected for the group. In block 1060, the selected group of integer-position filters is stored in an integer-position codebook. Having generated and stored a subpel codebook and an integer-position codebook, routine 1000 ends in block 1099.

Figure 11:
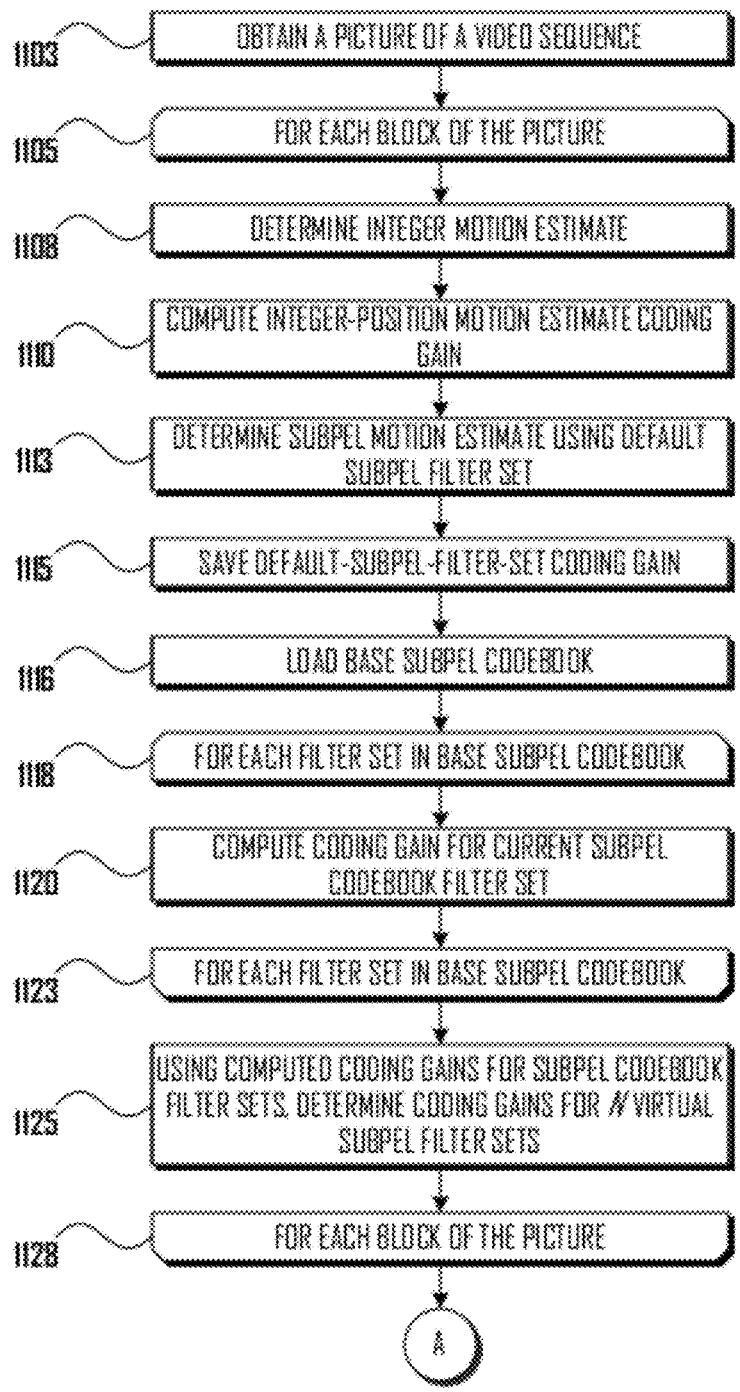
FIG. 11 shows an 'online' routine for searching a codebook for a motion filter set in accordance with one embodiment.

FIG. 11 shows an 'online' routine 1100 for searching a codebook for a motion filter set in accordance with one embodiment. In block 1103, routine 1100 obtains a picture or frame of a video sequence. Beginning in opening loop block 1105, routine 1100 processes each block of picture-content of the picture.

In block 1108, routine 1100 determines an integer-position motion estimate for the current block of picture-content. In one embodiment, an integer-position motion vector is computed by full or reduced search using a given motion search size. In block 1110, routine 1100 computes a coding gain (e.g., determines SAD) for the determined integer-position motion estimate.

In block 1113, routine 1100 determines a subpel motion estimate using a default filter set (e.g., the H.264 fixed filter set, or any other filter set for use as a reference). Interpolated subpel locations are searched to locate one with the highest coding gain (lowest SAD). In other words, the default filter set is applied to the block of picture-content and the location that produces the smallest SAD is chosen. The location to which that filter set corresponds is used as the estimated subpel motion vector. In block 1115, routine 1100 saves (at least temporarily) the overall coding gain for the default filter.

In block 1116, routine 1100 loads a "base" subpel codebook, including, e.g., 16 filter sets, each filter set including, e.g., 15 subpel-position filters (one for each ¼ pel subpel position). Optionally each filter set may also include an integer-position filter. In eighth-pel embodiments, each filter set may include 63 eighth-pel subpel-position filters. Beginning in block 1118, routine 1100 processes each filter set. In block 1120, routine 1100 computes a coding gain for the current filter set. Using the integer-position motion estimate as an offset, routine 1100 determines a SAD for each subpel position using the corresponding subpel-position filter from the current filter set. In other embodiments, a fixed-filter ½ pel subpel motion estimate may be used as an offset (in place of the integer-position motion estimate) for the adaptive ¼ pel subpel position filters, achieving, in effect, at least some benefits of adaptive eighth-pel subpel filtering, but at lower complexity.

In ending loop block 1123, routine 1100 iterates back to block 1118 to process the next filter set (if any).

In block 1123, routine 1100 assembles coding gains for N (e.g., 256) "virtual" filter sets using the computed coding gains for individual subpel-position filters in each of the filter sets. In one embodiment, the "virtual" filter sets include various combinations of individual subpel-position filters from the filter sets of the "base" subpel codebook. Thus, coding gains for each "virtual" filter set can be assembled using the individual subpel-position filter coding gains already computed (in block 1120).

In block 1128, routine 1100 iterates back to block 1105 to process the next block of picture-content (if any) of the picture.

In block 1133, routine 1100 sets a spatial partitioning mode. Depending on the mode of operation, frame-based, slice-based, block-based, segment-based, or a like division of the picture may be used. Beginning in opening loop block 1135, routine 1100 processes each spatial partition of the picture. In block 1138, routine 1100 selects from among the N "virtual" subpel filter sets a subpel filter set having a high coding gain for the current partition. In one embodiment, the best filter set is chosen in respect to the smallest SAD/largest coding gain. In some embodiments, the lowest mode of operation uses a frame-based division. The next two modes use slices. The lower slice mode divides a frame into four equal horizontal strips/slices (where the last slice could be smaller in size depending on the frame size). On the other hand, the higher slice mode uses 12×4 16×16 block slices (again the slices at the bottom and to the right border may be smaller due to frame size). The rest of the modes use the segments/regions which are derived from merging blocks into groups of blocks where same filter set produces low SAD. These regions in some sense correspond to motion partitions. There are two thresholds that are used in the process, and each mode has different selection of threshold values that can produce less or more segments/regions. The frame is first split into blocks/supertiles. The first threshold is used to determine how to split a 64×64 supertile into 32×32 tiles, while the second one is used to determine when to merge the tile blocks across supertile boundaries. In both cases, the merging or splitting decision is reached if the SAD difference of the two blocks/objects in question is below or above the given threshold. The splitting of a supertiles into tiles is coded with 2×2 patterns. Different modes of operation support basic 3 or extensed 7 patterns. The basic 3 patterns are solid, horizontal split and vertical split, while extended set also includes the four 3-way splits. Then, the next stage of the process is to merge tiles that touch the supertile borders with neighbors if there is a common filter set that result in small enough SAD (based on applying the second threshold). The merging bits are coded in the bitstream in addition to pattern variable-length codes ("VLCs") so that decoder can completely recover the same spatial segments.

Having selected a subpel filter set having a high coding gain for the current partition, in block 1140, routine 1100 encodes to a bitstream an index or other code (e.g., subpelfilt_code) corresponding to the selected subpel filter set. In various embodiments, a fixed VLC table, an adaptive Huffman coding table, or the like can be used to code the index or other code. If adaptive Huffman is used, the codes are, in one embodiment, computed based on the frequencies of indices from the previous frames, as it was observed in experiments that there exists a temporal redundancy, and same filter sets tend to appear in the neighboring frames.

In block 1141, routine 1100 loads an integer-position codebook including a number (e.g., 48) integer-position filters. In decision block 1143, routine 1100 determines whether the integer motion estimate (determined in block 1108) provides a higher coding gain (lower SAD) than the selected subpel filter set. If not, then routine 1100 proceeds to ending loop block 1153, where routine 1100 iterates back to block 1135 to process the next spatial partition (if any).

However, if the integer motion estimate (determined in block 1108) provides a higher coding gain (lower SAD) than the selected subpel filter set, then in block 1145, routine 1100 selects from the integer-position codebook an integer-position filter having a high (or the highest) coding gain for the current spatial partition. In decision block 1148, routine 1100 determines whether the selected integer-position filter provides the highest coding gain (smallest SAD). If so, then in block 1150, routine 1100 encodes to the bitstream an index or other code (e.g., intpelfilt_code) corresponding to the selected integer-position filter. In some embodiments, a flag or other 1-bit header is also coded to the bitstream to specify that the selected integer-position filter from the integer-position codebook produces a higher coding gain than the standard integer-position filter does In ending loop block 1153, routine 1100 iterates back to block 1135 to process the next spatial partition (if any). Once all spatial partitions are processed, routine 1100 ends in block 1199. In various embodiments, the method discussed can be applied per picture and one index to a filter set sent for an entire picture, a region or a segment, a group of slices, for each quadtree or bi-tree partitions of a frame or a tile, on group blocks of a frame, on tiles, or fragments of a tile.

FIG. 12 illustrates an exemplary bitstream syntax 1200, in accordance with various motion-compensation codebook filter encoders and decoders and variously described herein. Bitstream syntax 1200 begins with 3-bit header mfc_hdr 1201. One-bit pict_only flag 1202 indicates whether picture based filtering will take place or not. If 'yes,' the following optional syntax element numpt 1203 is skipped; if 'no,' the 3-bit numpt code 1203 is sent. Optional 3-bit numpt field 1203 indicates a number of partitions (up to eight).

Table 3 indicates an exemplary coding bit cost for encoding Motion-Compensation Codebook Filters according to various combinations of picture type and number of partitions (numpt), in accordance with various embodiments, including motion filtering modes (e.g. 'subpel', and 'int and subpel'), for P- and B-picture types. To reduce bit cost for B-pictures, 2 additional modes (e.g. 'picture subpel', and 'picture int subpel') are introduced. Overall, it can be seen that for P-pictures, signaling subpel filter set only takes between 13 and 43 bits (for up to 4 partitions), an signaling both int and subpel filters set only takes between 19 and 67 bits, and B-pictures for subpel between 22 and 79 bits, and B-pictures for int and subpel between 34 and 127 bits. (The exemplary coding bit costs shown in Table 3 exclude bit costs for spatial partition maps such as regions, slices, tiles or tile fragments, picture bi-tree or quad-tree, tile bi-tree or quad-tree, and/or merged blocks.)

TABLE 3

| | Number of Filter Sets and Coding bits cost | | | | | | | |
|---|---|---|---|---|---|---|---|---|
| | numpt = 1 | | numpt = 2 | | numpt = 3 | | numpt = 4 | |
| Picture Type (and motion filter modes) | Num Filt. Sets | Approx Bits cost* | Num Filt. Sets | Approx Bits cost* | Num Filt. Sets | Approx Bits cost* | Num Filt. Sets | Approx Bits cost* |
| I | — | — | — | — | — | — | — | — |
| P: subpel | 1 | 13 | 2 | 25 | 3 | 34 | 4 | 43 |
| P: int and subpel | 1 | 19 | 2 | 37 | 3 | 52 | 4 | 67 |
| B: picture, subpel | 2 | 22 | 2 | 22 | 2 | 22 | 2 | 22 |
| B: picture, int and subpel | 2 | 34 | 2 | 34 | 2 | 34 | 2 | 34 |
| B: subpel | 2 | 22 | 4 | 43 | 6 | 61 | 8 | 79 |
| B: int and subpel | 2 | 34 | 4 | 67 | 6 | 97 | 8 | 127 |

Optional 1-bit map_sent flag 1204 indicates whether a partition map is sent to indicate where the filter is applied or not, or alternatively, to switch between multiple filters. Optional n-bit ptmap field 1205 includes the partition map (if any).

One-bit filt_sent flag 1206 indicates whether a subpel filter code is included in the bitstream. If flag 1206 is set, then 8-bit subpelfilt_code 1208 is sent to identify the subpel filter set to be used; otherwise, subpelfilt_code 1208 is not sent.

Flag intfilt_sent 1210 indicates whether an integer-position filter code is included in the bitstream. When set to '1,' intfilt_sent 1210 indicates that 6-bit intpelfilt_code 1211 is sent to identify the integer-position filter to be used. Otherwise, intpelfilt_code 1211 is not sent.

The sequence of codes filt_sent 1206, subpelfilt_code 1208, intfilt_sent 1210, and intpelfilt_code 1211 occurs once only if there if only 1 partition (picture only) mode is used; else, the sequence is repeated numpt 1203 times.

Figure 13A:
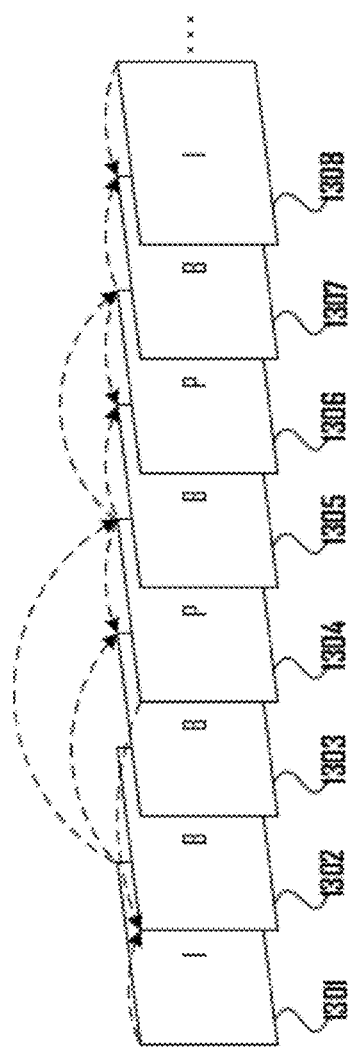
FIGS. 13a-b illustrate a sequence of pictures or frames within a video stream, in accordance with various embodiments.

FIG. 13a illustrates a sequence of pictures or frames 1301-1308 within a video stream, including I-frames 1301, 1308 (independently coded pictures); P-frames 1304, 1306 (unidirectionally predicted coded pictures); and B-frames 1302-1303, 1305, 1307 (bi-directionally predicted coded pictures), as is typical in video coding as per any of the MPEG standards. The illustrated picture structure also shows variable number of B-frames, although that fact in itself is not a key to our motion filtering discussion. More pertinently, while I-picture 1301, 1308 does not need motion filter set info, P-picture 1304, 1306 needs one or more filter sets, while B-pictures 1302-1303, 1305, 1307 need two (due to bidirectional references) or more filter sets.

Figure 13B:
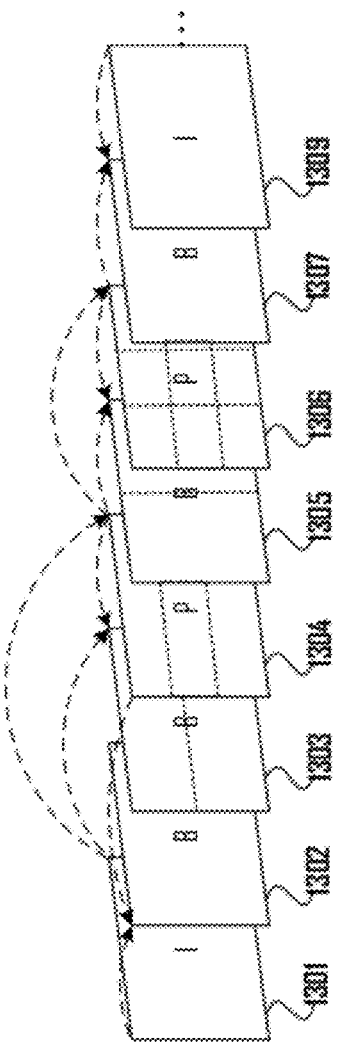

FIG. 13b illustrates a sequence of pictures or frames 1301-1308 within a video stream, including I-frames 1301, 1308, which are partitioned into three exemplary partitions (numpt=3); P-frames 1304, 1306, which are partitioned into three exemplary partitions (numpt=3); and B-frames 1302-1303, 1305, 1307, which are partitioned into two exemplary partitions (numpt=2). As illustrated in FIG. 13b, the partitions for motion filtering can be fully adaptive and on a picture basis can operate in any of the modes (picture, regions, slices, tiles, merged fragments of a tile, picture bi-tree or tile merged bi-tree, picture quadtree or tile merged quadtree, merged blocks, or the like). For instance, FIG. 13b shows that the first P-picture 1304 consists of 3 slices, while the second B-picture 1303 is bi-tree coded and consists of 2 partitions. Further, the second P-picture 1306 is partitioned into a 3×3 array of large tiles while the third B-frame 1305 is coded with a bi-tree split. Following examples of FIG. 13b, for the case of codebook motion filtering, motion filter bit counts for each picture in the shown picture structure, can be computed.

Figure 14:
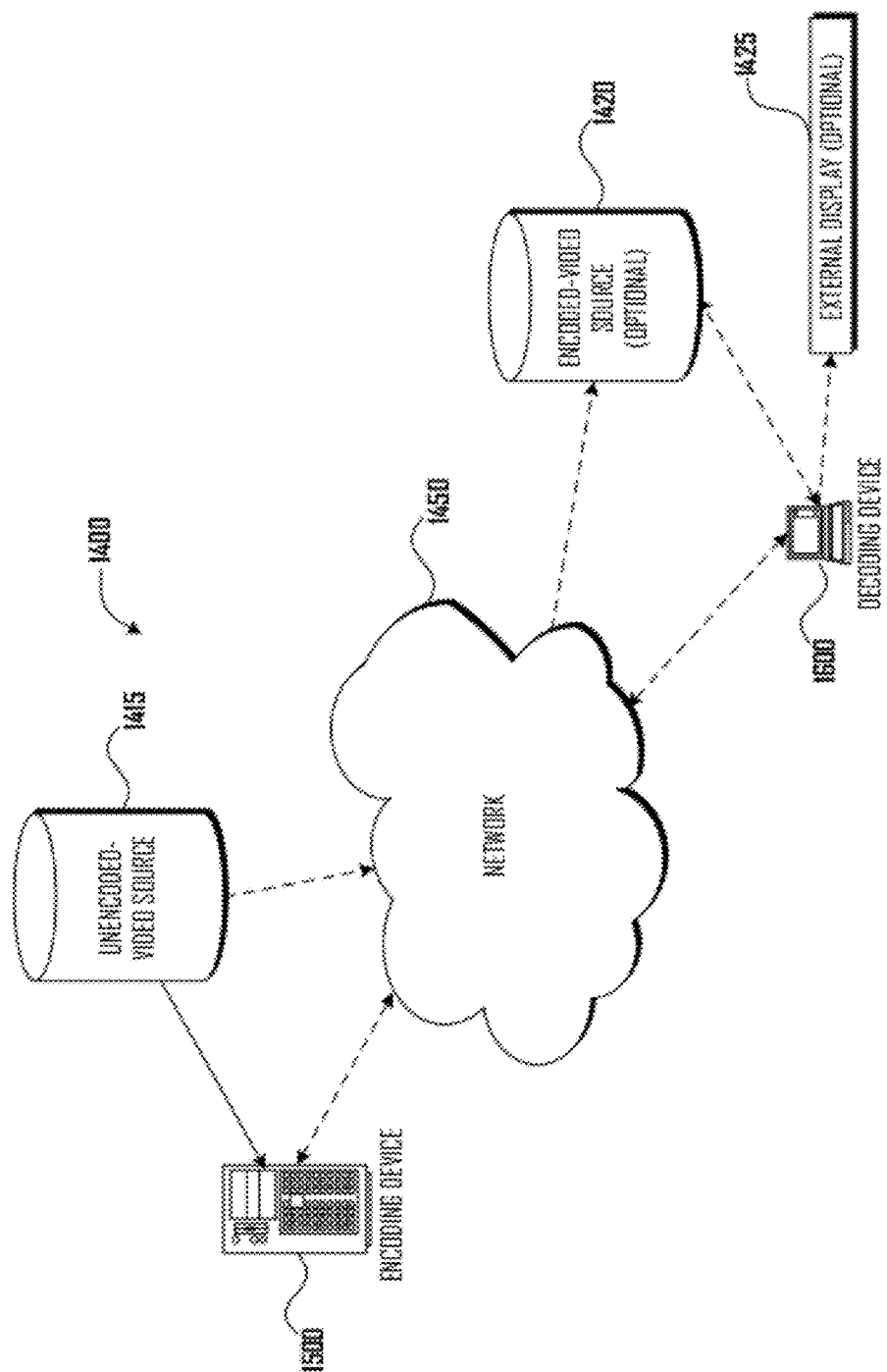
FIG. 14 illustrates an exemplary video encoding/decoding system according to one embodiment.

FIG. 14 illustrates an exemplary video encoding/decoding system 1400 according to one embodiment, the system 1400 including an unencoded-video source 1415, an encoding device 1500 (see FIG. 15, discussed below), decoding device 1600 (see FIG. 16, discussed below) with an optional external display 1425, and an optional encoded-video source 1420. In some embodiments, one or both of encoding device 1500 and/or decoding device 1600 may be connected to a network 1450. In some embodiments, decoding device 1600 and encoding device 1500 may comprise a single device. In some embodiments, more than one encoding device 1500 may be present; for example, one encoding device may perform "offline" codebook-generating processes, while another encoding device may perform "online" encoding processes, as discussed throughout this disclosure.

In some embodiments, other servers and/or devices (not shown) may also be present. For example, in some embodiments, a distribution server (not shown) may distribute encoded video to decoding device 1600 via network 1450.

In some embodiments, encoding device 1500 may communicate with unencoded-video source 1415 via network 1450, a storage area network ("SAN"), a high speed serial bus, and/or via other suitable communication technology. Similarly, in some embodiments, decoding device 1600 may communicate with encoded-video source 1420 via network 1450, a storage area network ("SAN"), a high speed serial bus, and/or via other suitable communication technology. In some embodiments, encoding device 1500, decoding device 1600, encoded-video source 1420, and/or unencoded-video source 1415 may comprise one or more replicated and/or distributed physical or logical devices.

In various embodiments, network 1450 may include the Internet, a local area network ("LAN"), a wide area network ("WAN"), a cellular data network, and/or other data network. In many embodiments, there may be more encoding devices 1500, decoding devices 1600, encoded-video sources 1420, and/or unencoded-video sources 1415 than are illustrated.

Figure 15:
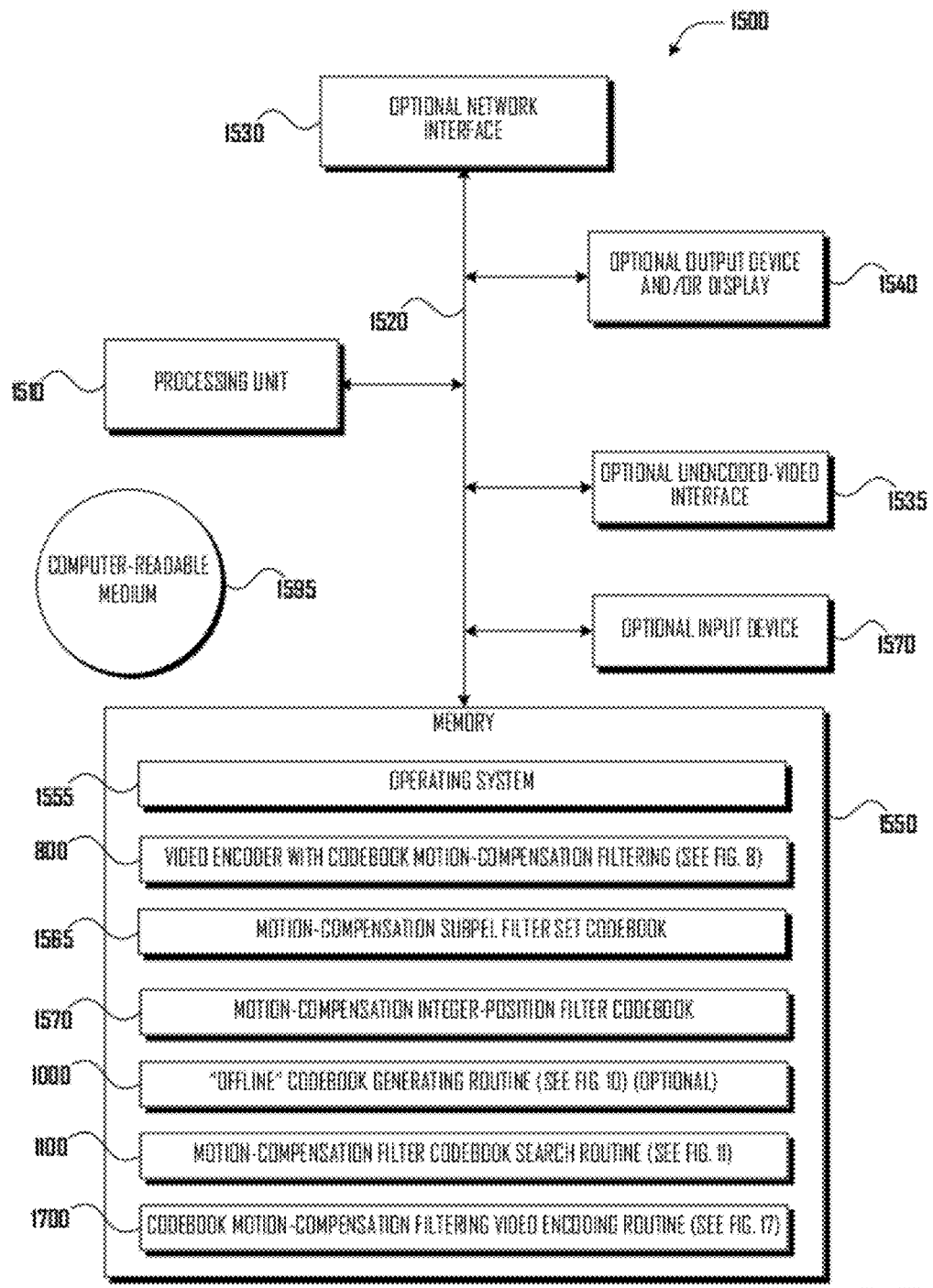
FIG. 15 illustrates several components of an exemplary encoding device, in accordance with one embodiment.

FIG. 15 illustrates several components of an exemplary encoding device 1500, in accordance with one embodiment. FIG. 15 illustrates several components of an exemplary encoding device 1500. In some embodiments, encoding device 1500 may include many more components than those shown in FIG. 15. However, it is not necessary that all of these generally conventional components be shown in order to disclose an illustrative embodiment. As shown in FIG. 15, encoding device 1500 includes an optional network interface 1530 for optionally connecting to the network 1450.

The Encoding device 1500 also includes at least one processing unit 1510 (e.g., a general purpose central processing unit, an embedded processing unit, a special-purpose video processing unit, or the like), a memory 1550, an optional output device and/or display 1540, and an optional input device 1570 (e.g., a keyboard, mouse, remote, joy stick, and the like), all interconnected along with the optional network interface 1530 via a bus 1520. The memory 1550 generally comprises a random access memory ("RAM"), a read only memory ("ROM"), and a permanent mass storage device, such as a disk drive. The memory 1550 stores a video encoder with codebook motion-compensation filtering 800 (see FIG. 8, discussed above); one or both of a motion-compensation subpel filter set codebook 1565 and a motion-compensation integer-position filter codebook 1570; an optional "offline" codebook generating routine 1000 (see FIG. 10, discussed above); a motion-compensation filter codebook search routine 1100 (see FIG. 11, discussed above); and a codebook motion-compensation filtering video encoding routine (see FIG. 17, discussed below). In addition, the memory 1550 also stores an operating system 1555. In some embodiments, these software components may be loaded from a computer readable storage medium 1595 into memory 1550 of the encoding device 1500 using a drive mechanism (not shown) associated with a non-transient computer readable storage medium 1595, such as a floppy disc, tape, DVD/CD-ROM drive, memory card, or the like. In some embodiments, software components may also be loaded via the optional network interface 1530, rather than via a computer readable storage medium 1595.

In some embodiments, encoding device 1500 may further comprise a specialized interface 1535 for communicating with unencoded-video source 1415, such as a high speed serial bus, or the like. In some embodiments, encoding device 1500 may communicate with unencoded-video source 1415 via network interface 1530. In other embodiments, unencoded-video source 1415 may reside in memory 1550.

Although an exemplary encoding device 1500 has been described that generally conforms to conventional general purpose computing devices, an encoding device 1500 may be any of a great number of devices capable of encoding video, for example, a video recording device, a video co-processor and/or accelerator, a personal computer, a game console, a set-top box, a handheld computer, a cell phone, or any other suitable device.

Figure 16:
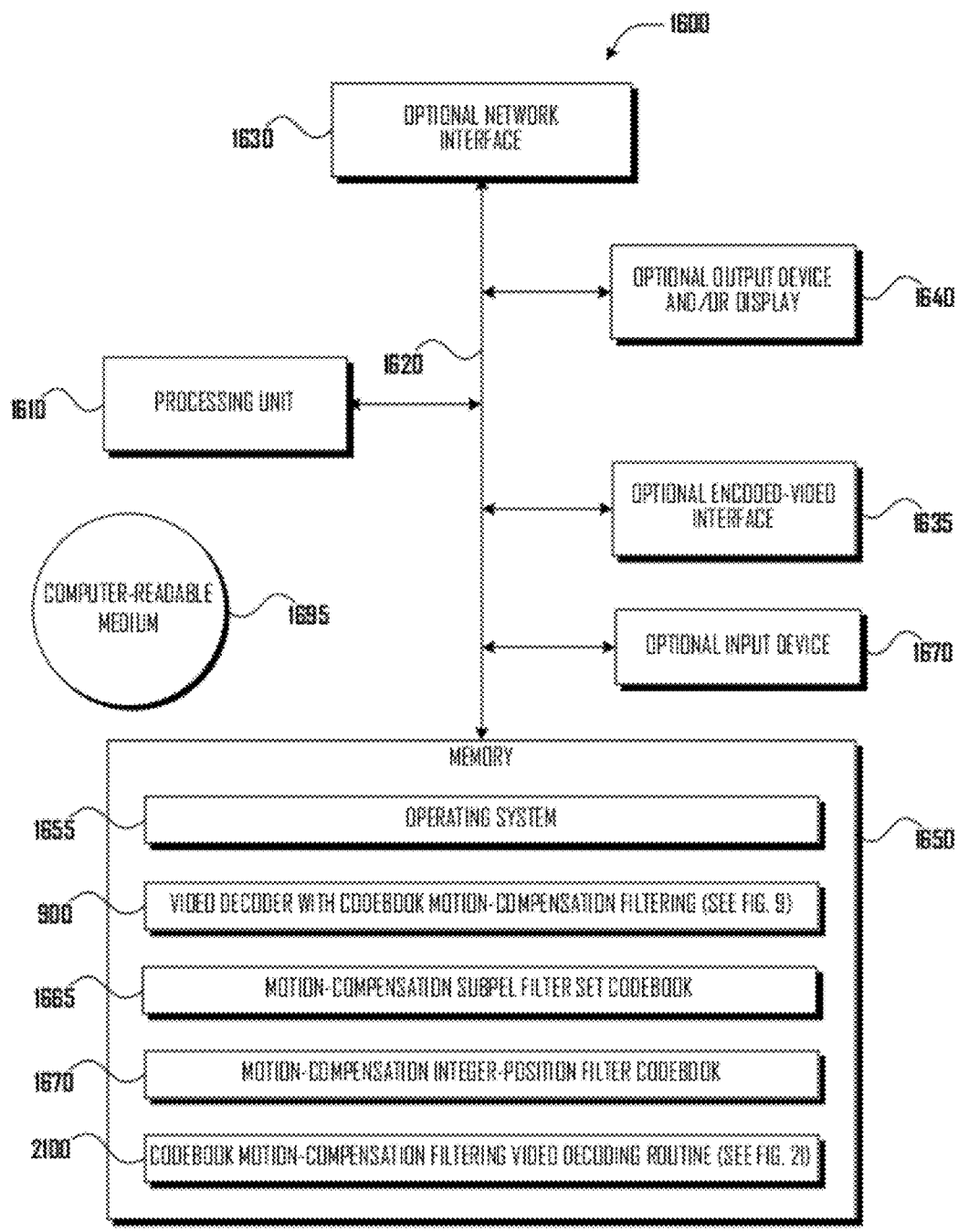
FIG. 16 illustrates several components of an exemplary decoding device, in accordance with one embodiment.

FIG. 16 illustrates several components of an exemplary decoding device 1600, in accordance with one embodiment. In some embodiments, decoding device 1600 may include many more components than those shown in FIG. 16. However, it is not necessary that all of these generally conventional components be shown in order to disclose an illustrative embodiment. As shown in FIG. 16, decoding device 1600 includes an optional network interface 1630 for optionally connecting to the network 1450.

The Decoding device 1600 also includes at least one processing unit 1610 (e.g., a general purpose central processing unit, an embedded processing unit, a special-purpose video processing unit, or the like), a memory 1650, an optional output device and/or display 1640, and an optional input device 1670 (e.g., a keyboard, mouse, remote, joy stick, and the like), all interconnected along with the optional network interface 1630 via a bus 1620. The memory 1650 generally comprises a random access memory ("RAM"), a read only memory ("ROM"), and a permanent mass storage device, such as a disk drive. The memory 1650 stores program code for a video decoder 900 with codebook Motion-compensation filtering (see FIG. 9, discussed above); one or both of a motion-compensation subpel filter set codebook 1665 and a motion-compensation integer-position filter codebook 1670; and a codebook motion-compensation filtering video decoding routine (see FIG. 21, discussed below). In addition, the memory 1650 also stores an operating system 1655. In some embodiments, these software components may be loaded from a computer readable storage medium 1695 into memory 1650 of the Decoding device 1600 using a drive mechanism (not shown) associated with a non-transient computer readable storage medium 1695, such as a floppy disc, tape, DVD/CD-ROM drive, memory card, or the like. In some embodiments, software components may also be loaded via the optional network interface 1630, rather than via a computer readable storage medium 1695.

In some embodiments, decoding device 1600 may further comprise a specialized interface 1635 for communicating with encoded-video source 1420, such as a high speed serial bus, or the like. In some embodiments, decoding device 1600 may communicate with encoded-video source 1420 via network interface 1630. In other embodiments, encoded-video source 1415 may reside in memory 1650.

Although an exemplary Decoding device 1600 has been described that generally conforms to conventional general purpose computing devices, an decoding device 1600 may be any of a great number of devices capable of decoding video, for example, a video-play device, a personal computer, a game console, a set-top box, a handheld computer, a cell phone, or any other suitable device.

Figure 17:
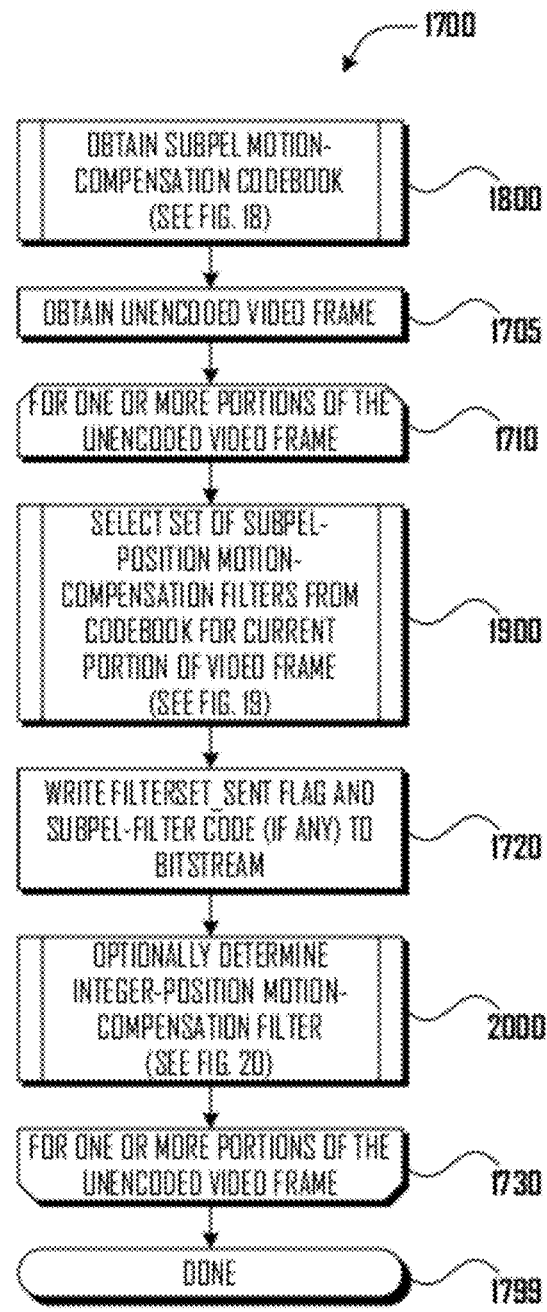
FIG. 17 illustrates a codebook motion-compensation filtering video encoding routine, such as may be performed by encoding device in accordance with one embodiment.

FIG. 17 illustrates a codebook motion-compensation filtering video encoding routine 1700, such as may be performed by encoding device 1500 in accordance with one embodiment. In subroutine block 1800 (see FIG. 18, discussed below), routine 1700 obtains a codebook including a multiplicity of motion-compensation filters grouped into a plurality of subpel-position groups that respectively correspond to a plurality of subpel positions, each of the plurality of subpel-position groups comprising a plurality of motion-compensation filters suitable for interpolating blocks of a picture at a corresponding one of the plurality of subpel positions. For example, as discussed above in reference to Table 1, a codebook may include a multiplicity of motion-compensation filters (e.g., $a_{0\ldots 15}, b_{0\ldots 15} \ldots o_{0\ldots 15}$) grouped into subpel-position groups, such as the following:

subpel position {a} group: {$a_0, a_1, a_{2\ldots 15}$};

subpel position {b} group: {$b_0, b_1, b_{2\ldots 15}$};

⋮ subpel position {o} group: {$o_0, o_1, o_{2\ldots 15}$}.

In block 1705, routine 1700 obtains an unencoded frame or picture of video for encoding. In some cases, the unencoded frame or picture of video may be determined to include a number of different portions (see, e.g., FIGS. 7*a-f*, showing various partitioning modes for dividing a picture into portions). In other cases, the entire unencoded frame or picture of video may be treated as a single portion.

During encoding of the unencoded frame or picture, routine 1700 processes each of the one or more portions of the unencoded frame or picture beginning in starting loop block 1710. In subroutine block 1900 (see FIG. 19, discussed below), routine 1700 selects a subset of the multiplicity of motion-compensation filters from the codebook as being well-adapted for the current portion of the video frame or picture, the selected subset including one from each of the plurality of subpel-position groups. For example, as discussed above in reference to Table 1, a codebook may be further characterized as including a number (e.g., 256) of pre-determined subsets of motion-compensation filters, one from each subpel position group, e.g.:

subset id = 0: {$a_0, b_0, c_0, d_0, e_0, f_0, g_0, h_0, i_0, j_0, k_0, l_0, m_0, n_0, o_0$};

subset id = 1: {$a_1, b_1, c_1, d_1, e_1, f_1, g_1, h_1, i_1, j_1, k_1, l_1, m_1, n_1, o_1$};

⋮ subset id = 15:

{$a_{15}, b_{15}, c_{15}, d_{15}, e_{15}, f_{15}, g_{15}, h_{15}, i_{15}, j_{15}, k_{15}, l_{15}, m_{15}, n_{15}, o_{15}$};

subset id = 16: {$a_0, b_5, c_7, d_9, e_4, f_4, g_{12}, h_6, i_7, j_2, k_4, l_{11}, m_8, n_0, o_{10}$};

⋮ subset id =

255: {$a_{10}, b_6, c_{12}, d_9, e_2, f_2, g_3, h_{10}, i_3, j_5, k_1, l_8, m_{11}, n_6, o_{10}$}.

Subroutine block 1900 returns a filterset_sent flag and (if the filterset_sent flag==1) a subpel-filter set code identifying the selected subset of the plurality of motion-compensation filters within the codebook. For example, in one embodiment, the subpel-filter set code may be (or be derived from) a "subset id" number or other index into the codebook. In block 1720, routine 1700 writes the returned filterset_sent flag and subpel-filter set code (if indicated by filterset_sent flag) to an encoded bitstream being generated by routine 1700.

In subroutine block 2000, routine 1700 optionally determines an integer-position motion-compensation filter (see FIG. 20 discussed below) for the current portion of the unencoded frame or picture. In ending loop block 1730, routine 1700 iterates back to block 1710 to process the next portion of the unencoded frame or picture (if any). Having thus encoded at least a motion-compensation filter set to the bitstream, routine 1700 ends in block 1799. In many cases, routine 1700 may be performed serially for a number of frames of a video, routine 1700 being part of a larger video-encoding process.

Figure 18:
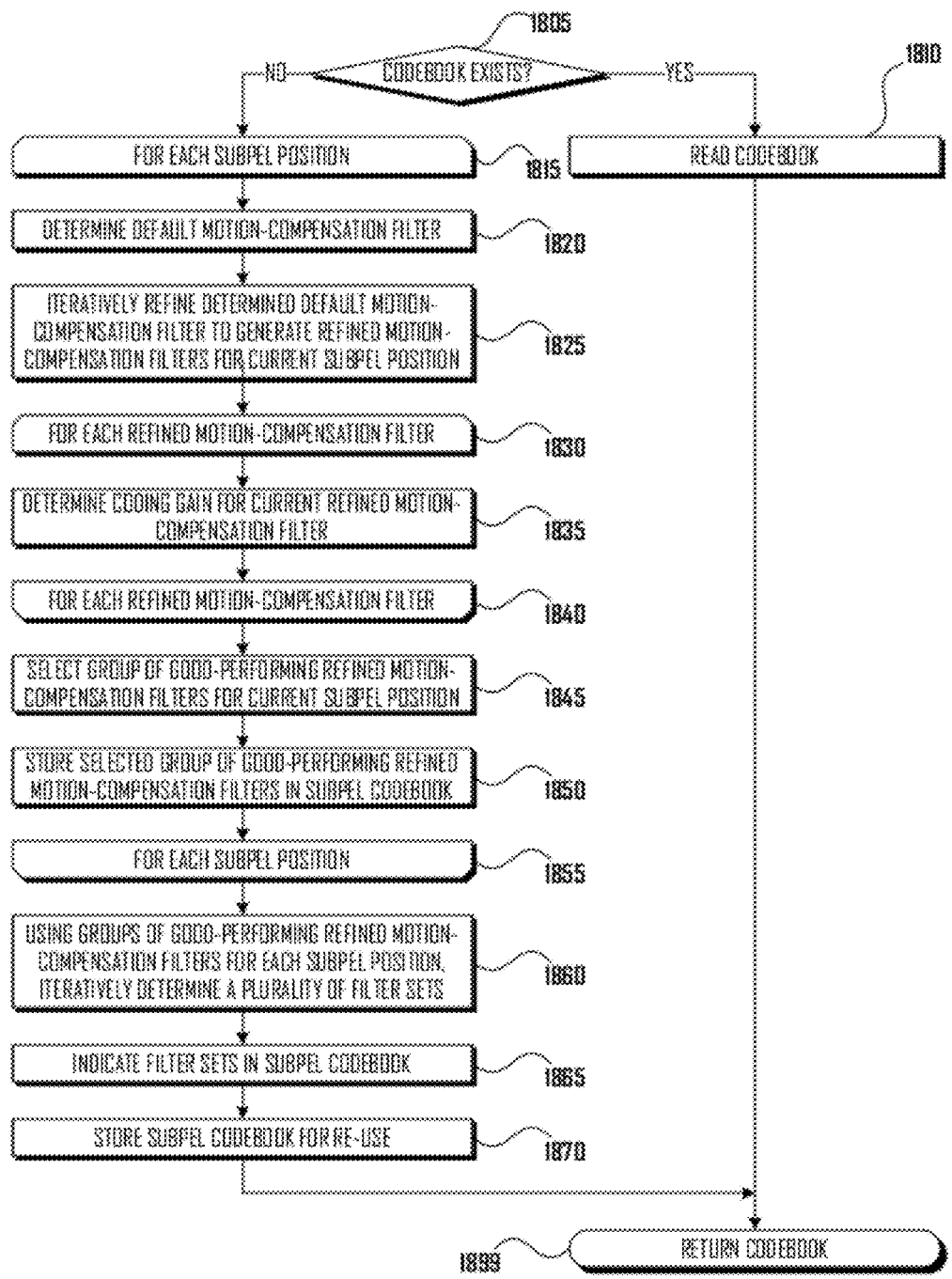
FIG. 18 illustrates a subroutine for obtaining a codebook, in accordance with one embodiment.

FIG. 18 illustrates a subroutine 1800 for obtaining a codebook, in accordance with one embodiment. In some embodiments, the process of generating a codebook may be quite lengthy (taking hours or even days), so the codebook may be generated only once (or at least infrequently) and stored for re-use. In decision block 1805, subroutine 1800 determines whether a previously-generated codebook has been stored for re-use. If so, then in block 1810, subroutine 1800 reads the stored codebook and returns it in ending block 1899.

However, if a previously-generated codebook has not been stored for re-use, then subroutine 1800 begins the process of generating a codebook. In some embodiments, blocks 1815-1865 may be performed independently, as an "offline" codebook-generating routine. Blocks 1815-1865 can be understood as an alternate view or alternate characterization similar to the processes shown in blocks 1005-1050 of FIG. 10, which is discussed above at length. For the sake of brevity, the subject matter discussed above in relation to FIG. 10 will generally not be reiterated in the discussion, below, of FIG. 18.

Beginning in starting loop block 1815, subroutine 1800 processes each of a number of subpel positions. For example, in one embodiment, subroutine 1800 processes ¼ pel subpel positions a-o, as illustrated in FIG. 3, discussed above. In other embodiments, subroutine 1800 may process 63 eighth-pel subpel positions.

In block 1820, subroutine 1800 determines a default motion-compensation filter for the current subpel position. For example, in one embodiment, subroutine 1800 may use a fixed subpel motion-compensation filter, such as from the H.264 fixed filter set or any other suitable default set of filters.

In block 1825, subroutine 1800 iteratively refines the determined default motion-compensation filter to generate a multiplicity of refined motion-compensation filters for the current subpel position. For example, in one embodiment, subroutine 1800 may employ a random walk algorithm (or a similar optimization algorithm) to iteratively refine the determined default motion-compensation filter to generate a multiplicity of refined motion-compensation filters.

Beginning in starting loop block 1830, subroutine 1800 processes each of the refined multiplicity of refined motion-compensation filters. In block 1835, subroutine 1800 determines a coding gain (e.g., a measure of SAD) for the current refined motion-compensation filter. In block 1840, subroutine 1800 iterates back to block 1830 to process the next refined motion-compensation filter (if any).

In block 1845, subroutine 1800 uses the determined coding gains to select a group of good-performing refined motion-compensation filters for the current subpel position (e.g., a group of filters with high coding gain/low SAD). In block 1850, subroutine 1800 stores the selected group of good-performing refined motion-compensation filters for the current subpel position. In ending loop block 1855, subroutine 1800 iterates back to block 1815 to process the next subpel position (if any). In some embodiments, the selected group of good-performing refined motion-compensation filters may be considered as "base" filters (as discussed above) for the current subpel position, which together with "base" filters for other subpel positions, form a "base" codebook or "base" group of filter sets.

In block 1860, subroutine 1800 uses the groups of good-performing refined motion-compensation filters (one group for each subpel position) to iteratively determine a plurality of filter sets, each filter set including a distinct combination of filters, one filter for each subpel position. (In some contexts in this disclosure, "filter sets" are also referred to as "subsets" of motion compensation filters, e.g., $\{a_0, b_5, c_7, d_9, e_4, f_4, g_{12}, h_6, i_7, j_2, k_4, l_{11}, m_8, n_0, o_{10}\}$.) In some embodiments, subroutine 1800 may iteratively determine the plurality of filter sets/subsets using a random walk algorithm (or a similar optimization algorithm). In block 1865, subroutine 1800 indicates the determined filter sets/subsets in the codebook, such that each of the determined filter sets/subsets can be addressed, selected, indexed, or otherwise identified within the codebook. For example, in one embodiment, subroutine 1800 may assign each of the determined filter sets/subsets an "id" number or index.

In block 1870, subroutine 1800 stores the codebook thus generated for subsequent re-use. In block 1899, subroutine 1800 ends, returning the codebook.

Figure 19:
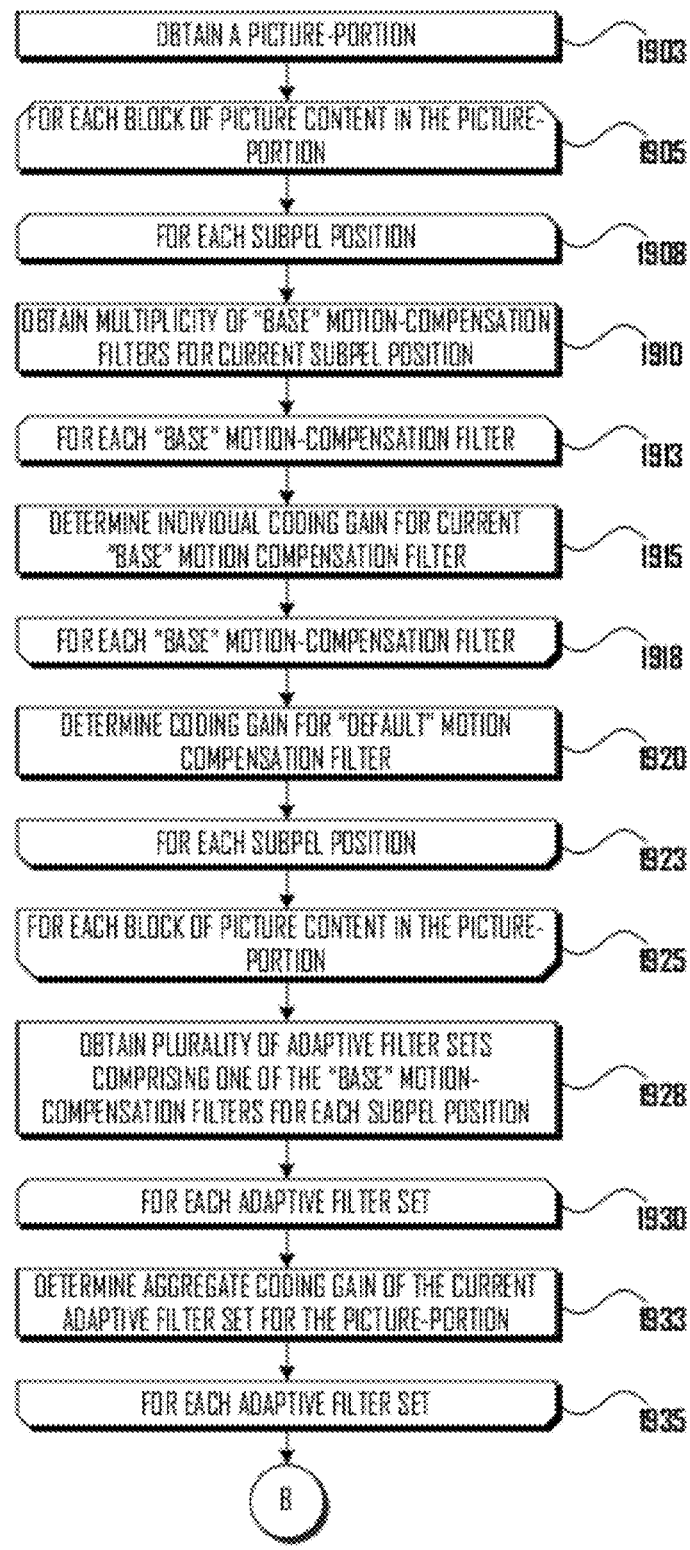
FIG. 19 illustrates a subroutine for selecting a subset of motion-compensation filters from the codebook, in accordance with one embodiment.

FIG. 19 illustrates a subroutine 1900 for selecting a subset of motion-compensation filters from the codebook, in accordance with one embodiment. FIG. 19 can be understood as an alternate view or alternate characterization similar to the processes shown in FIG. 11, which is discussed above at length. For the sake of brevity, the subject matter discussed above in relation to FIG. 11 will generally not be reiterated in the discussion, below, of FIG. 19.

In block 1903, subroutine 1900 obtains at least a portion of a picture (see, e.g., FIGS. 7a-f, showing various partitioning modes for dividing a picture into portions), the portion of a picture including a number of blocks of picture content. Beginning in starting loop block 1905, subroutine 1900 processes each block of picture content of the picture-portion. Beginning in starting loop block 1908, subroutine 1900 processes each of a number of subpel positions (e.g., a-o, as illustrated in FIG. 3, discussed above).

In block 1910, subroutine 1900 obtains a multiplicity of "base" motion-compensation filters for the current subpel position (e.g., $a_0, a_1, a_2 \ldots a_{15}$). Beginning in starting loop block 1913, subroutine 1900 processes each of the "base" motion-compensation filters for the current subpel position. In block 1915, subroutine 1900 determines an individual coding gain (e.g., by computing a SAD) for the current "base" motion-compensation filter for the current subpel position (e.g., $a_0$). In ending loop block 1918, subroutine 1900 iterates back to block 1913 to process the next "base" motion-compensation filter (if any) for the current subpel position.

Having determined coding gains for each of the "base" motion-compensation filters for the current subpel position, in block 1920, subroutine 1900 determined a coding gain for a "default" motion-compensation filter, which is part of a default motion-compensation filter set. For example, in one embodiment, subroutine 1900 may determine a coding gain for a fixed motion-compensation filter for the current subpel position, such as one of the filters from the set of fixed motion-compensation filter used in H.264 or other suitable set of "default" motion-compensation filter.

In ending loop block 1923, subroutine 1900 iterates back to block 1908 to process the next subpel position (if any). In ending loop block 1925, subroutine 1900 iterates back to block 1905 to process the next block of picture content of the picture-portion (if any).

In block 1928, subroutine 1900 obtains a plurality of adaptive filter sets, each filter set comprising one of the "base" motion-compensation filters for each subpel position. For example, in one embodiment, subroutine 1900 may obtain a codebook including a plurality of adaptive filter sets such as the following:

set $id = 0$: $\{a_0, b_0, c_0, d_0, e_0, f_0, g_0, h_0, i_0, j_0, k_0, l_0, m_0, n_0, o_0\}$;

set $id = 1$: $\{a_1, b_1, c_1, d_1, e_1, f_1, g_1, h_1, i_1, j_1, k_1, l_1, m_1, n_1, o_1\}$;

$\vdots$ set $id =$

15: $\{a_{15}, b_{15}, c_{15}, d_{15}, e_{15}, f_{15}, g_{15}, h_{15}, i_{15}, j_{15}, k_{15}, m_{15}, n_{15}, o_{15}\}$;

set $id = 16$: $\{a_0, b_5, c_7, d_9, e_4, f_4, g_{12}, h_6, i_7, j_2, k_4, l_{11}, m_8, n_0, o_{10}\}$;

$\vdots$ set $id = 255$: $\{a_{10}, b_6, c_{12}, d_9, e_2, f_2, g_3, h_{10}, i_3, j_5, k_1, l_8, m_{11}, n_6, o_{10}\}$.

Beginning in starting loop block 1930, subroutine 1900 processes each of the obtained adaptive filter sets. In block 1933, subroutine 1900 determines an aggregate coding gain for the current adaptive filter set. For example, in one embodiment, determining an aggregate coding gain may include summing individual coding gains (as determined in block 1915) for the constituent filters of the current adaptive filter set. In ending loop block 1935, subroutine 1900 iterates back to block 1930 to process the next adaptive filter set (if any).

Having determined aggregate coding gains for each of the each of the adaptive filter sets, in block 1938, subroutine 1900 determines a "default" aggregate coding gain for the "default" filter set (e.g., the set of fixed filters from H.264 or other suitable set), using the individual "default" coding gains determined in block 1920, discussed above.

In block 1940, using the aggregate coding gains determined in block 1933, subroutine 1900 selects an adaptive filter set with a favorable aggregate coding gain for the portion of a picture obtained in block 1903. In some embodiments, the selected adaptive filter set may be the adaptive filter set with the highest determined aggregate coding gain.

In decision block 1943, subroutine 1900 compares the "default" aggregate coding gain determined in block 1938 with the aggregate coding gain of the selected favorable adaptive filter set. If the "default" filter set provides higher coding gain (lower SAD), then in block 1950, subroutine 1900 sets a filterset_sent flag to '0' or 'NO,' and returns the filterset_sent flag in ending block 1999.

However, if the adaptive filter set provides higher coding gain (lower SAD), then in block 1945, subroutine 1900 sets a filterset_sent flag to '1' or 'YES,' and in block 1948, subroutine 1900 determines a subpel-filter set code identifying the selected adaptive filter set. For example, in one embodiment, the subpel-filter set code may be (or be derived from) a "subset id" number or other index into a codebook. Subroutine 1900 returns the filterset_sent flag and the determined subpel-filter set code in ending block 1999.

Figure 20:
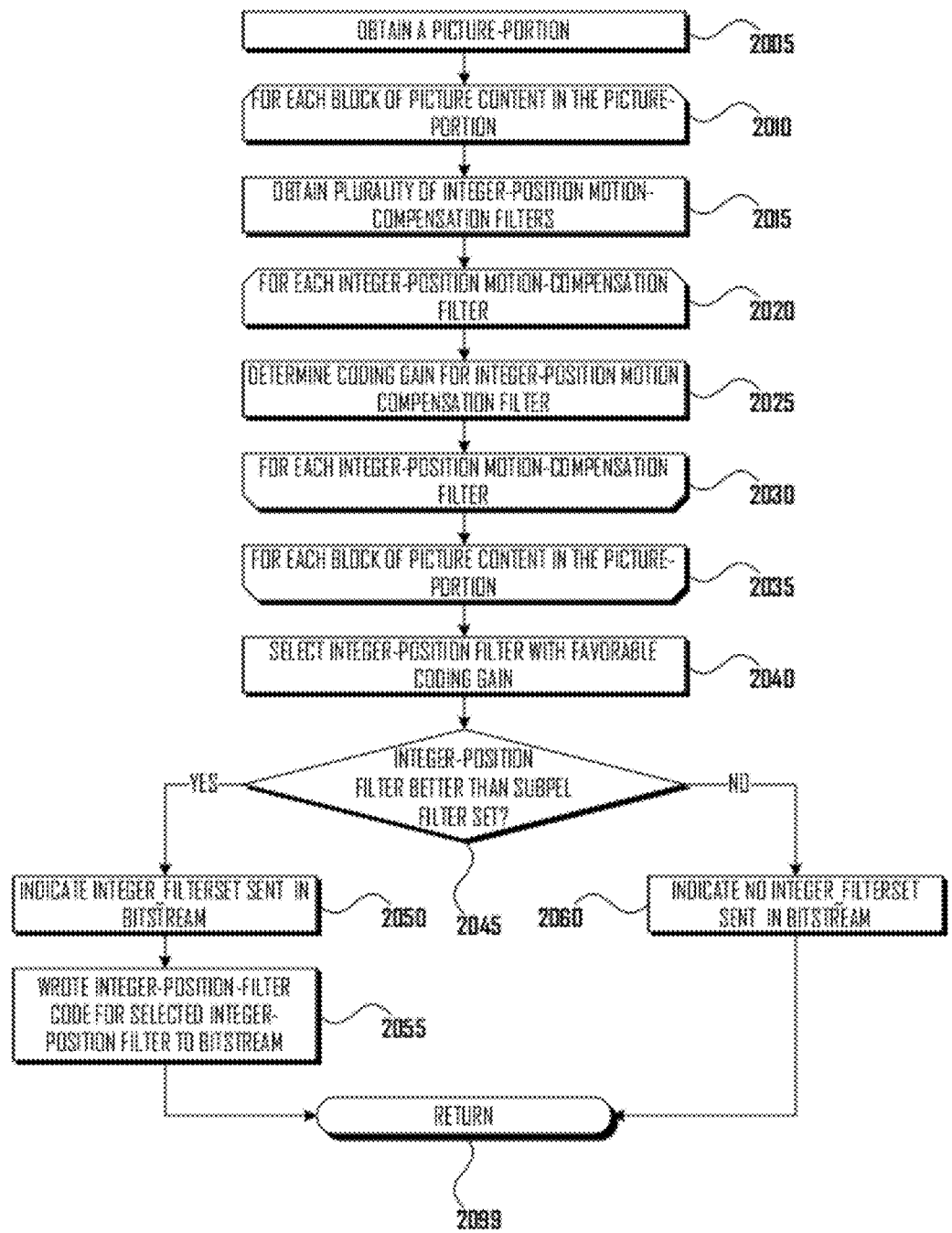
FIG. 20 illustrates a subroutine for determining an integer-position motion-compensation filter for a portion of a picture, in accordance with one embodiment.

FIG. 20 illustrates a subroutine 2000 for determining an integer-position motion-compensation filter for a portion of a picture, in accordance with one embodiment. In block 2005, subroutine 2000 obtains at least a portion of a picture (see, e.g., FIGS. 7a-f, showing various partitioning modes for dividing a picture into portions), the portion of a picture including a number of blocks of picture content. Beginning in starting loop block 2010, subroutine 2000 processes each block of picture content of the picture-portion.

In block 2015, subroutine 2000 obtains a plurality of integer-position motion-compensation filters, e.g., $0_0, 0_1, 0_2 \ldots 0_{47}$. For example, in one embodiment, subroutine 2000 may obtain an integer-position codebook, such as that partially shown in Table 2, above. In other embodiments, the plurality of integer-position motion-compensation filters may be included within a codebook that also includes subpel-position filters.

Beginning in starting loop block 2020, subroutine 2000 processes each of the plurality of integer-position motion-compensation filters. In block 2025, subroutine 2000 determines an individual coding gain (e.g., by computing a SAD) for the current integer-position motion-compensation filter. In ending loop block 2030, subroutine 2000 iterates back to block 2020 to process the next integer-position motion-compensation filter (if any). In ending loop block 2035, subroutine 2000 iterates back to block 2010 to process the next block of picture content (if any) of the picture-portion.

Once coding gains have been determined for each integer-position motion-compensation filter and each block of picture content of the picture-portion, in block 2040, subroutine 2000 selects one of the plurality of integer-position motion-compensation filters as having a favorable coding gain (low SAD) for the current picture-portion.

In decision block 2045, subroutine 2000 compares the coding gain of the selected favorable integer-position motion-compensation filter with a coding gain of a subpel filter set also selected for the same picture-portion (see, e.g., discussion of block 2040 in FIG. 20, above). If the subpel filter set provides higher coding gain (lower SAD), then in block 2060, subroutine 2000 sets an intfilt_sent flag in the bitstream to '0' or 'NO,' and returns in ending block 2099.

However, if the favorable integer-position motion-compensation filter provides higher coding gain (lower SAD), then in block 2050, subroutine 2000 sets an intfilt_sent flag to '1' or 'YES,' and in block 2055, subroutine 2000 writes to the bitstream an integer-position-filter code identifying the selected favorable integer-position motion-compensation filter. For example, in one embodiment, the integer-position-filter code may be (or be derived from) a "id" number or other index into a codebook. Subroutine 2000 returns in ending block 2099.

Figure 21:
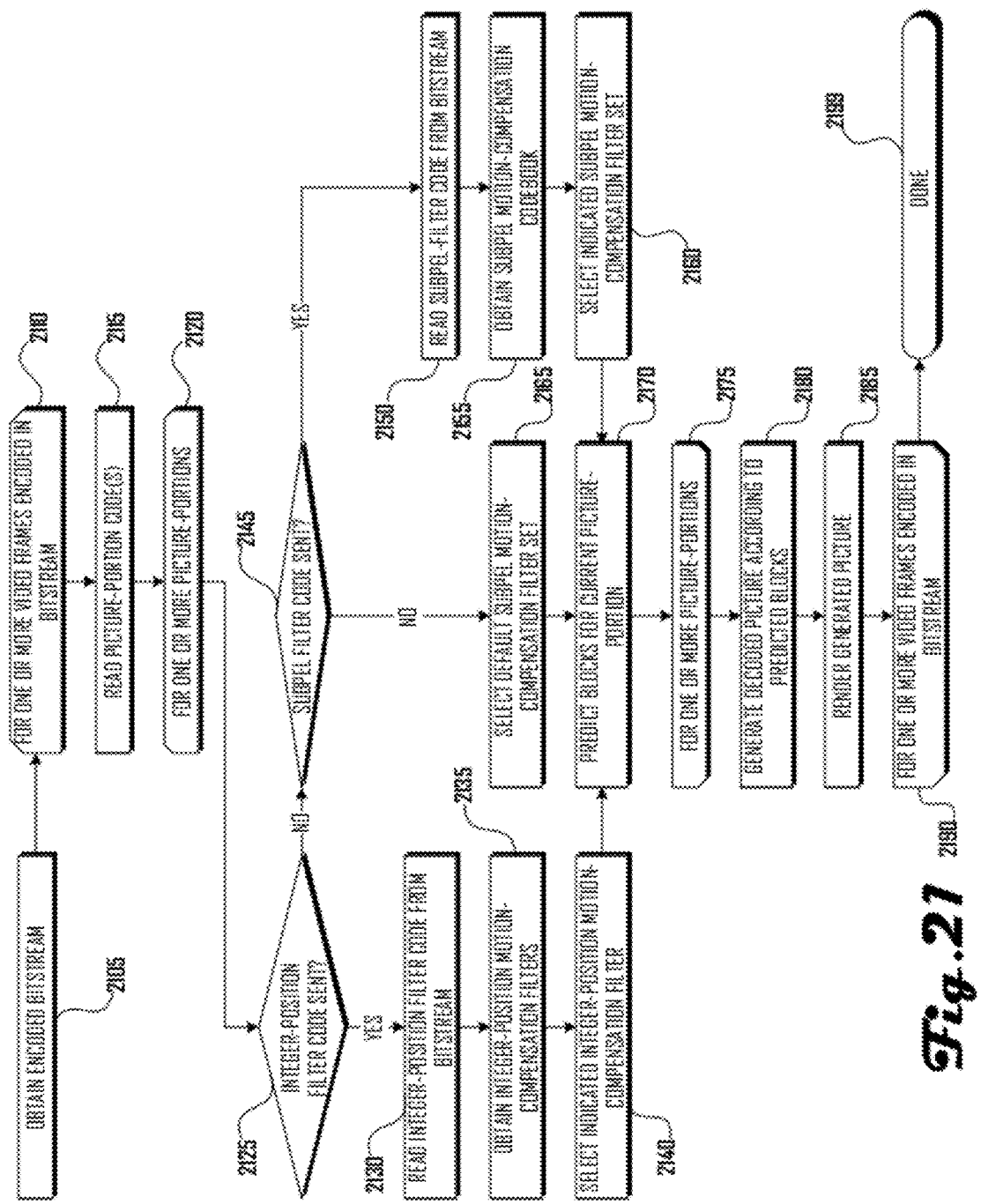
FIG. 21 illustrates a codebook motion-compensation filtering video decoding routine, such as may be performed by decoding device in accordance with one embodiment.

FIG. 21 illustrates a codebook motion-compensation filtering video decoding routine 2100, such as may be performed by decoding device 1600 in accordance with one embodiment. In block 2105, routine 2100 obtains an encoded bitstream from an encoded-video source, the encoded bitstream including one or more pictures or frames of video. Beginning in starting loop block 2110, routine 2100 processes each of the encoded pictures or frames of video.

In block 2115, routine 2100 reads from the bitstream one or more picture-portion codes identifying one or more picture-portions (see, e.g., FIGS. 7*a-f,* showing various partitioning modes for dividing a picture into portions) of the current encoded picture or frame. For example, in one embodiment, routine 2100 may read some or all of codes such as pict_only 1202, numpt 1203, map_sent 1204, and/or ptmap 1205, as shown in FIG. 12 and discussed above.

Beginning in starting loop block 2120, routine 2100 processes each of the one or more picture-portions of the current encoded picture or frame of video.

In decision block 2125, routine 2100 determines whether the encoded bitstream includes an integer-position filter code for the current picture-portion of the current encoded picture or frame of video. For example, in one embodiment, routine 2100 may determine whether the encoded bitstream includes an intfilt_sent flag 1210, as shown in FIG. 12 and discussed above.

If routine 2100 determines that the encoded bitstream includes such an integer-position filter code, then in block 2130, routine 2100 reads an integer-position filter code from the bitstream. For example, in one embodiment, routine 2100 may read an intpelfilt_code 1211 code from the bitstream, as shown in FIG. 12 and discussed above.

In block 2135, routine 2100 obtains a plurality of integer-position motion-compensation filters, e.g., $0_0, 0_1, 0_2 \ldots 0_{47}$. For example, in one embodiment, subroutine 2000 may obtain an integer-position codebook, such as that partially shown in Table 2, above. In other embodiments, the plurality of integer-position motion-compensation filters may be included within a codebook that also includes subpel-position filters. Typically, routine 2100 would read a previously-stored copy of the plurality of integer-position motion-compensation filters from a memory accessible to routine 2100.

In block 2140, routine 2100 selects one of the plurality of integer-position motion-compensation filters as indicated by the integer-position filter code (e.g. intpelfilt_code 1211) read from the bitstream in block 2130. Subroutine 2100 then uses the selected integer-position motion-compensation filter in block 2170 to predict blocks of the current picture-portion of the current encoded picture or frame of video.

However, if in decision block 2125, routine 2100 determines that the encoded bitstream does not include an integer-position filter code, then in decision block 2145, routine 2100 determines whether the encoded bitstream includes an subpel filter set code for the current picture-portion of the current encoded picture or frame of video. For example, in one embodiment, routine 2100 may determine whether the encoded bitstream includes an filt_sent flag 1206, as shown in FIG. 12 and discussed above. If not, then in block 2165, routine 2100 selected a default subpel motion-compensation filter set (e.g., the set of fixed subpel filters used in H.264, or other suitable set of default filters). Subroutine 2100 then uses the default subpel motion-compensation filter set in block 2170 to predict blocks of the current picture-portion of the current encoded picture or frame of video.

If, however, routine 2100 determines in decision block 2145 that the encoded bitstream includes an subpel filter set code for the current picture-portion of the current encoded picture or frame of video, then in block 2150, routine 2100 reads an subpel filter set code from the bitstream. For example, in one embodiment, routine 2100 may read an subpelfilt_code 1208 code from the bitstream, as shown in FIG. 12 and discussed above.

In block 2155, routine 2100 obtains a subpel motion-compensation codebook, such as that partially shown in Table 1, discussed above. Typically, routine 2100 would read a previously-stored copy of the subpel motion-compensation codebook from a memory accessible to routine 2100.

In block 2140, routine 2100 selects one of the plurality of subpel motion-compensation filter sets as indicated by the subpel filter set code (e.g. subpelfilt_code 1208) read from the bitstream in block 2150. Subroutine 2100 then uses the selected subpel motion-compensation filter set in block 2170 to predict blocks of the current picture-portion of the current encoded picture or frame of video.

In ending loop block 2175, routine 2100 iterates back to block 2120 to process the next picture-portion (if any) of the current encoded picture or frame of video.

In block 2180, routine 2100 generates a decoded picture according to the predicted blocks of the one or more picture portions predicted in various iterations of block 2170. In block 2185, routine 2100 renders the generated picture to a display associated with the device performing routine 2100.

In ending loop block 2190, routine 2100 iterates back to block 2110 to process the next encoded picture or frame of video (if any). Routine 2100 ends in block 2199.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A video-encoder-device-implemented method for encoding an adaptive motion-compensation filter set for a plurality of subpel positions for predicting portions of an encoded video frame, the method comprising:
   obtaining, by the video encoder device, a codebook comprising a multiplicity of motion-compensation filters grouped into a plurality of subpel-position groups that respectively correspond to the plurality of subpel positions, each of the plurality of subpel-position groups comprising a plurality of motion-compensation filters suitable for interpolating portions of a picture at a corresponding one of the plurality of subpel positions, the plurality of motion-compensation filters comprising a base codebook of filter sets and a virtual codebook of filter sets, the virtual codebook of filter sets comprising combinations of filters selected from the base codebook of filter sets;
   obtaining, by the video encoder device, an unencoded frame of video for encoding by the video encoder device;
   selecting a portion of the frame of video as a picture partition according to a partitioning mode;
   encoding, by the video encoder device, the selected picture partition to a bitstream; and
   during encoding of the picture partition, the video encoder device:
      selecting from the codebook a subset of the plurality of motion-compensation filters as being well-adapted for predicting the picture partition, the selected subset comprising one from each of the plurality of subpel-position groups; and
      including in the bitstream a code identifying the picture partitioning mode and a subpel-filter code identifying the selected subset of the plurality of motion-compensation filters within the codebook.

2. The method of claim 1, wherein selecting the subset of the plurality of motion-compensation filters comprises selecting one of a plurality of pre-determined subsets of the plurality of motion-compensation filters.

3. The method of claim 2, wherein the code identifying the picture partitioning mode included in the bitstream comprises an index identifying the selected subset among the plurality of pre-determined subsets.

4. The method of claim 2, wherein selecting the one of the plurality of pre-determined subsets of the plurality of motion-compensation filters comprises:
   for the picture partition, determining a multiplicity of individual coding gains for the multiplicity of motion-compensation filters;
   using the determined multiplicities of individual coding gains, determining an aggregate coding gain for each of the plurality of pre-determined subsets of the plurality of motion-compensation filters as applied to the picture partition; and
   selecting one of the plurality of pre-determined subsets as having a favorable aggregate coding gain for the picture partition.

5. The method of claim 4, further comprising:
   determining a default aggregate coding gain for a default filter set applied to the picture partition, the default picture set comprising a plurality of default subpel motion-compensation filters corresponding respectively to the plurality of subpel positions;
   determining that the favorable aggregate coding gain is more favorable than the default aggregate coding gain; wherein,
   the default filter set is the base codebook of filter sets.

6. The method of claim 1, further comprising:
   obtaining a plurality of integer-position motion-compensation filters; and
   during encoding of at least the picture partition, the video encoder device selecting one of the plurality of integer-position motion-compensation filters as being well-adapted for predicting the picture partition.

7. The method of claim 6, further comprising:
   determining that the selected one of the plurality of integer-position motion-compensation filters provides better coding gain than the selected subset of the plurality of motion-compensation filters; and
   including in the bitstream generated by the video encoder device:
      an integer-filter code identifying the selected one of the plurality of integer-position motion-compensation filters; and
      an integer-filter flag indicating that the integer-filter code is included in the bitstream for at least the portion of the frame of video.

8. The method of claim 6, wherein the codebook further comprises the plurality of integer-position motion-compensation filters as the base codebook of filter sets.

9. The method of claim 6, wherein obtaining the plurality of integer-position motion-compensation filters comprises obtaining an integer-position codebook.

10. The method of claim 1, wherein obtaining the codebook comprises:
   obtaining a plurality of base motion-compensation filters corresponding respectively to the plurality of subpel positions;
   generating a plurality of virtual subpel-position group filters corresponding respectively to the plurality of subpel positions by performing at least steps (i), (ii), and (iii) for each of the plurality of subpel positions:
      (i) iteratively selecting combinations of filters from the base motion-compensation filters to generate a multiplicity of refined motion-compensation filters corresponding to the current subpel position;
      (ii) determining coding gains corresponding respectively to the base motion-compensation filters and synthesizing coding gains of the multiplicity of refined motion-compensation filters;
      (iii) according to the determined and synthesized coding gains, selecting from the generated multiplicity of refined motion-compensation filters a subpel-position group of good-performing motion-compensation filters corresponding to the current subpel position as the virtual codebook filter set.

11. The method of claim 10, further comprising selecting a plurality of subsets of good-performing motion-compensation filters, each subset comprising one good-performing motion-compensation filter selected from each of the plurality of subpel-position groups.

12. A non-transitory computer-readable storage medium storing instructions that, when executed by a processor, perform the method of claim 1.

13. A video-encoding apparatus comprising a processor and a storage medium storing instructions that, when executed by the processor, perform the method of claim 1.

* * * * *